United States Patent
Su et al.

(10) Patent No.: US 11,910,135 B2
(45) Date of Patent: Feb. 20, 2024

(54) OPTICAL SIGNAL TRANSMISSION METHOD AND RELATED APPARATUS

(71) Applicant: Huawei Technologies Co., Ltd., Shenzhen (CN)

(72) Inventors: Wei Su, Dongguan (CN); Qiuyou Wu, Dongguan (CN); Junling Xiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 17/859,422

(22) Filed: Jul. 7, 2022

(65) Prior Publication Data

US 2022/0337925 A1 Oct. 20, 2022

Related U.S. Application Data

(63) Continuation of application No. PCT/CN2020/142382, filed on Dec. 31, 2020.

(30) Foreign Application Priority Data

Jan. 8, 2020 (CN) .......................... 202010019363.5

(51) Int. Cl.
*H04Q 11/00* (2006.01)
(52) U.S. Cl.
CPC .............................. *H04Q 11/0067* (2013.01)
(58) Field of Classification Search
CPC .................................................. H04Q 11/0067

(Continued)

(56) References Cited

U.S. PATENT DOCUMENTS 9,882,672 B2 * 1/2018 Vissers .................. H04B 10/27
2007/0248121 A1 * 10/2007 Zou ........................ H04J 3/1652
370/476

(Continued)

FOREIGN PATENT DOCUMENTS

| CN | 101742364 A | 6/2010 |
| CN | 102369681 A | 3/2012 |

(Continued)

OTHER PUBLICATIONS

China Telecom et al., Considerations on the requirements for OSU in G.sup.sub1G, International telecommunication union, Oct. 28-Nov. 1, 2019, 3 pages.

(Continued)

*Primary Examiner* — Dalzid E Singh
(74) *Attorney, Agent, or Firm* — Conley Rose, P.C.

(57) ABSTRACT

An optical signal transmission method includes mapping a first optical data unit frame to a first flexible tributary unit frame, where the first flexible tributary unit frame includes a plurality of payload blocks; mapping the first flexible tributary unit frame to a first optical payload unit frame, where the plurality of payload blocks are distributed in a payload area of the first optical payload unit frame; mapping the first optical payload unit frame to a second optical data unit frame, where a bit rate of the second optical data unit frame is greater than a bit rate of the first optical data unit frame; mapping the second optical data unit frame to a first optical transport unit frame; and sending the first optical transport unit frame.

20 Claims, 22 Drawing Sheets

(58) Field of Classification Search
USPC .......................................................... 398/182
See application file for complete search history.

(56) References Cited

U.S. PATENT DOCUMENTS

| | | |
|---|---|---|
| 2008/0131117 A1 | 6/2008 | Cho et al. |
| 2012/0002965 A1 | 1/2012 | Bellato et al. |
| 2012/0163812 A1* | 6/2012 | Youn ..................... H04J 3/1658 398/45 |
| 2015/0093113 A1* | 4/2015 | Vissers ................... H04J 14/08 398/66 |
| 2019/0140759 A1* | 5/2019 | Su .......................... H04Q 11/04 |

FOREIGN PATENT DOCUMENTS

| | | |
|---|---|---|
| CN | 102893629 A | 1/2013 |
| CN | 107566074 A | 1/2018 |

OTHER PUBLICATIONS

Huawei Technologies Co., Ltd et al., Sub1G OTN mapping mechanism consideration, International telecommunication union, Oct. 28-Nov. 1, 2019, 4 pages.

China Information Communication Technologies Group, Transport of sub-1G services over OTN using flexible mapping, International telecommunication union, Oct. 28-Nov. 1, 2019, 5 pages.

ZTE Corporation, Thoughts on evolution of OTN, International telecommunication union, Oct. 27-Nov. 1, 2019, 3 pages.

Huawei Technologies, Considerations on a Generic Tributary Procedure (GTP), International telecommunication union, Oct. 28-Nov. 1, 2019, 17 pages.

* cited by examiner

| Columns | 1 — 7 | 8 — 14 | 15  16 | 17 — 3824 | 3825 — 4080 |
|---|---|---|---|---|---|
| Rows 1 | FAS | OTUk OH | | | |
| 2 | ODUk OH | | OPUk OH | OPUk | FEC |
| 3 | | | | | |
| 4 | | | | | |

| MSI | Indicated meaning |
|---|---|
| MSI[0] | PT=0x24 |
| MSI[1] | Quantity of LO ODU services |
| MSI[2] | Tributary port number TPN #1 of the first LO ODU service |
| MSI[3] | Quantity C of payload blocks occupied by the LO ODU service whose tributary port number is TPN #1 |
| MSI[4] | Tributary port number TPN #2 of the second LO ODU service |
| MSI[5] | Quantity C of payload blocks occupied by the LO ODU service whose tributary port number is TPN #2 |
| MSI[6] | ... |
| ... | ... |

FIG. 6C

| MSI | Indicated meaning |
|---|---|
| MSI[0] | PT=0x24 |
| MSI[1] | Quantity of LO ODU services |
| MSI[2] | TPN #i |
| MSI[3] | TPN #j |
| MSI[4] | TPN #k |
| MSI[5] | TPN #i |
| ... | ... |
| MSI[P] | TPN #j |
| MSI[P+1] | TPN #i |

OPTICAL SIGNAL TRANSMISSION METHOD AND RELATED APPARATUS

CROSS-REFERENCE TO RELATED APPLICATIONS

This application is a continuation application of International Patent Application No. PCT/CN2020/142382, filed on Dec. 31, 2020, which claims priority to Chinese Patent Application No. 202010019363.5, filed on Jan. 8, 2020. The disclosures of the aforementioned applications are hereby incorporated by reference in their entireties.

TECHNICAL FIELD

This application relates to the field of optical transmission technologies, and in particular, to some optical signal transmission methods and related apparatuses.

BACKGROUND

As a core technology of a next generation transport network, an optical transport network (OTN) may be used to flexibly schedule and manage a large-capacity service, and increasingly becomes a mainstream technology of a backbone transport network. In an electrical layer, the OTN technology defines a digital wrapping structure with a powerful function, which can manage and monitor a client service signal.

In a conventional solution, generally, a plurality of client service signals is mapped by using a fixed slot as a mapping granularity. In practice for some scenarios, bandwidth utilization is not high in the conventional solution, flexibility in adjustment of a transmission rate of the client service signal is not high, and it may be difficult to meet a transmission requirement of the client service signal.

SUMMARY

To resolve technical problems in a conventional OTN technology that bandwidth utilization is not high and flexibility in adjustment of a transmission rate of a client service signal is not high, embodiments of this application provide optical signal transmission methods and related apparatuses.

A first aspect of the embodiments of this application provides an optical signal transmission method, including mapping a first optical data unit frame to a first flexible tributary unit frame, where the first flexible tributary unit frame includes a plurality of payload blocks; mapping the first flexible tributary unit frame to a first optical payload unit frame, where the plurality of payload blocks included in the first flexible tributary unit frame are distributed in a payload area of the first optical payload unit frame; mapping the first optical payload unit frame to a second optical data unit frame, where a bit rate of the second optical data unit frame is greater than a bit rate of the first optical data unit frame; mapping the second optical data unit frame to a first optical transport unit frame; and sending the first optical transport unit frame.

The first flexible tributary unit frame may be, for example, a flexible tributary unit (TUflex) frame. The TUflex frame in this embodiment of this application may include one or more payload blocks, and each payload block in the flexible tributary unit frame has a size of Y bits (Y is a positive integer). Compared with other flexible tributary unit frames including one or more fixed tributary slots, a bit rate of the TUflex frame including one or more payload blocks may have more flexible adjustment space, because a granularity of the payload block is far smaller than that of the tributary slot, the payload block in the TUflex frame may be designed to any size based on a requirement, and the payload block may be set to different sizes based on different transmission periods.

The first optical data unit (ODU) frame is, for example, a low-order (LO) ODU frame, such as an LO ODUj or ODUflex frame. The first optical payload unit (OPU) frame may be, for example, a high-order (HO) OPU frame, and the HO OPU frame may be, for example, an OPUk4 frame or an OPUCn frame. The second optical data unit frame may be, for example, a HO ODU frame.

It may be understood that the payload block in the payload area of the first optical payload unit frame may only come from the payload block in the first TUflex frame. In an example, the payload block in the payload area of the first OPU frame may not only come from the payload block in the first TUflex frame, but also may come from another optical signal container.

A distribution manner, in the payload area of the first OPU frame, of the plurality of payload blocks included in the first TUflex frame may be uniform distribution or non-uniform distribution. In a case of uniform distribution, a specific uniform distribution manner may be determined by using, but is not limited to, a sigma-delta algorithm.

In the solution enumerated above, a payload block may be used as a mapping granularity in a payload area of an OPU frame. Because a granularity size of the payload block is far smaller than a granularity size of a tributary slot, compared with a solution in which the tributary slot is used as a mapping granularity, the technical solution in this embodiment helps improve bandwidth utilization and flexibility in adjustment of a transmission rate of a client service signal.

In some possible implementations, quantities of payload blocks that come from the first flexible tributary unit frame and that are mapped to different transmission periods of the first OPU frame may be fixed or variable.

For example, a quantity of payload blocks included in the first TUflex frame is $C_{TUflex} = C_{LOODU}$ (the quantities of payload blocks that come from the first TUflex frame and that are mapped to different transmission periods of the first OPU frame are variable). For another example, the quantity of payload blocks included in the first TUflex frame is $C_{TUflex} \geq C_{max}$ (the quantities of payload blocks that come from the first TUflex frame and that are mapped to different transmission periods of the first OPU frame are fixed).

A quantity of payload blocks in the first TUflex frame that need to be occupied by the first optical data unit frame is $C_{LOODU}$, and a value range of $C_{LOODU}$ is $[C_{min}, C_{max}]$, where:

$$C_{max} = \text{ceiling}[R_{LOODU} * (1 + OS_{HOOPU})/(R_{PB-P} * (1 - OS_{HOOPU}))], \text{ and}$$

$$C_{min} = \text{floor}[R_{LOODU} * (1 - OS_{HOOPU})/(R_{PB-P} * (1 + OS_{HOOPU}))].$$

$R_{HOOPU}$ represents a payload bit rate of the first OPU frame, $OS_{HOOPU}$ represents a rate frequency offset of the first OPU frame, $R_{HOOPU} = R_{PB} * P$, $R_{LOODU}$ represents the bit rate of the first optical data unit frame, $OS_{LOODU}$ represents a rate frequency offset of the first optical data unit frame, $R_{PB}$ represents a payload block rate of the first OPU frame, and P represents a quantity of payload blocks in a transmission period of the first OPU frame.

In some possible implementations, the mapping a first optical data unit frame to a first TUflex frame includes splitting the first optical data unit frame into X-bit code blocks and forming an X-bit code block stream; and mapping a plurality of consecutive X-bit code blocks in the X-bit code block stream to the first TUflex frame, where the plurality of consecutive X-bit code blocks are in a one-to-one correspondence with the plurality of payload blocks included in the first TUflex frame.

It may be understood that the first optical data unit frame may include N optical data unit frames, and the splitting the first optical data unit frame into a plurality of X-bit code blocks and forming an X-bit code block stream includes splitting the first optical data unit frame into M X-bit code blocks and forming the X-bit code block stream. X may be an integer multiple of 64, for example, X=N*64. M and N are positive integers. X may alternatively be equal to 240 or 238 or another value.

When frame alignment needs to be performed, M is, for example, equal to 239. M may alternatively be equal to 478, 100, 250, 500, or another value. N may be, for example, equal to 1, 2, 3, 4, 5, 6, 7, 8, 10, 12, 19, 20, 50, 100, 200, 500, or another value.

When N is greater than 1, an overhead area of the first OPU frame may carry a multiframe identifier, and the multiframe identifier is used to indicate an arrangement location of a current optical data unit frame in the N optical data unit frames (that is, the multiframe identifier is used to indicate a specific frame that is the current optical data unit frame in the N optical data unit frames). For example, assuming that N is equal to 3, the multiframe identifier may be used to indicate that the current optical data unit frame is the first frame, the second frame, or the third frame in the three optical data unit frames; or assuming that N is equal to 2, the multiframe identifier may be used to indicate that the current optical data unit frame is the first frame or the second frame in the two optical data unit frames. Another case may be obtained by analogy.

In an example, the first optical data unit frame includes one optical data unit frame, and the splitting the first optical data unit frame into X-Bit code blocks and forming an X-bit code block stream may include splitting the first optical data unit frame into 239 X-Bit code blocks and forming the X-bit code block stream. For example, X=64.

For another example, the first optical data unit frame includes two optical data unit frames, and the splitting the first optical data unit frame into X-bit code blocks and forming a code block stream includes splitting the first optical data unit frame into 239 X-Bit code blocks and forming the X-bit code block stream. For example, X=128. The overhead area of the first OPU frame may carry a multiframe identifier, and the multiframe identifier is used to indicate an arrangement location of a current optical data unit frame in the two optical data unit frames. The multiframe identifier may be, for example, a multiframe alignment signal MFAS or an optical multiframe identifier OMFI. When the multiframe identifier is the multiframe alignment signal MFAS, for example, a least significant 1 bit of the MFAS is used to indicate the arrangement location of the current frame in the two optical data unit frames. Alternatively, when the multiframe identifier includes the optical multiframe identifier OMFI, the OMFI is used to indicate the arrangement location of the current frame in the two optical data unit frames.

For another example, the first optical data unit frame includes three optical data unit frames, and the splitting the first optical data unit frame into X-bit code blocks and forming a code block stream includes splitting the first optical data unit frame into 239 X-Bit code blocks and forming the code block stream. For example, X=192. The overhead area of the first OPU frame may carry a multiframe identifier, and the multiframe identifier is used to indicate an arrangement location of a current optical data unit frame in the three optical data unit frames. The multiframe identifier may be, for example, a multiframe alignment signal MFAS or an optical multiframe identifier OMFI. When the multiframe identifier includes the multiframe alignment signal MFAS, for example, least significant 2 bits of the MFAS are used to indicate the arrangement location of the current frame in the three optical data unit frames. Alternatively, when the multiframe identifier includes the optical multiframe identifier OMFI, the OMFI is used to indicate the arrangement location of the current frame in the three optical data unit frames.

For another example, the first optical data unit frame includes four optical data unit frames, and the splitting the first optical data unit frame into X-bit code blocks and forming a code block stream includes splitting the first optical data unit frame into 239 X-Bit code blocks and forming the code block stream. For example, X=256. The overhead area of the first OPU frame may carry a multiframe identifier, and the multiframe identifier is used to indicate an arrangement location of a current optical data unit frame in the four optical data unit frames. The multiframe identifier may be, for example, a multiframe alignment signal MFAS or an optical multiframe identifier OMFI. When the multiframe identifier includes the multiframe alignment signal MFAS, for example, least significant 2 bits of the MFAS are used to indicate the arrangement location of the current frame in the four optical data unit frames. Alternatively, when the multiframe identifier includes the optical multiframe identifier OMFI, the OMFI is used to indicate the arrangement location of the current frame in the four optical data unit frames.

A case in which N is another value may be obtained by analogy.

In some possible implementations, each of the plurality of payload blocks included in the first TUflex frame carries a client service identifier of the first optical data unit frame. The client service identifier is used to identify a client service to which the payload block belongs. The client service identifier may be, for example, a tributary port number (TPN). When the payload block carries the client service identifier of the first optical data unit frame, Y>X, that is, a size of a payload block is greater than a size of an X-bit code block. It should be understood that the TPN may also be referred to as a tributary port identifier (TPID) or another name.

In some possible implementations, the first OPU frame carries an overhead identifier. The overhead identifier is used to indicate distribution locations that are of the plurality of payload blocks included in the first TUflex frame and that are in the payload area of the first OPU frame. Therefore, based on the overhead identifier, a receive end can determine the distribution locations that are of the plurality of payload blocks included in the first TUflex frame and that are in the payload area of the first OPU frame. The overhead identifier may be carried in the overhead area of the first OPU frame, or the overhead identifier may be carried in at least one payload block in the first OPU frame (for example, the overhead identifier may be carried in a specific payload block in the first OPU frame).

Certainly, if the distribution locations that are of the plurality of payload blocks included in the first TUflex frame and that are in the payload area of the first OPU frame are agreed by default, the first OPU frame may not need to carry the overhead identifier, and the receive end may determine, based on an agreement made by default, the distribution locations that are of the plurality of payload blocks included in the first TUflex frame and that are in the payload area of the first OPU frame.

In some implementations, when a rate needs to be adjusted, the method further includes mapping a third optical data unit frame to a second flexible tributary unit frame, where the second TUflex frame includes C2 payload blocks; mapping the second TUflex frame to a second OPU frame, where the C2 payload blocks are distributed in a payload area of the second OPU frame, $R2=C1*R1/C2$, R1 is a bit rate of the first OPU frame, R2 is a bit rate of the second OPU frame, C1 is a quantity of payload blocks included in the first TUflex frame, and the third optical data unit frame and the first optical data unit frame are used to bear service data of a same client; mapping the second OPU frame to a fourth optical data unit frame, where a bit rate of the fourth optical data unit frame is greater than a bit rate of the third optical data unit frame; mapping the fourth optical data unit frame to a second optical transport unit frame; and sending the second optical transport unit frame.

In some other implementations, when a rate needs to be adjusted, the method further includes mapping a third optical data unit frame to a second TUflex frame; mapping the second TUflex frame to a second optical payload unit frame, where a plurality of payload blocks included in the second TUflex frame are distributed in a payload area of the second OPU frame, $P2=P1*R2/R1$, R1 is a bit rate of the first OPU frame, R2 is a bit rate of the second OPU frame, P1 is a quantity of payload blocks included in a transmission period of the first OPU frame, P2 is a quantity of payload blocks included in a transmission period of the second OPU frame, a quantity of payload blocks included in the second TUflex frame is the same as a quantity of payload blocks included in the first TUflex frame (for example, the quantities of payload blocks both are C1), and the third optical data unit frame and the first optical data unit frame are used to bear service data of a same client; mapping the second OPU frame to a fourth optical data unit frame, where a bit rate of the fourth optical data unit frame is greater than a bit rate of the third optical data unit frame; mapping the fourth optical data unit frame to a second optical transport unit frame; and sending the second optical transport unit frame.

It may be learned that in the two rate adjustment manners enumerated above, a quantity of payload blocks included in a TUflex frame or a quantity of payload blocks included in a transmission period of an OPU frame is adjusted, to flexibly and accurately adjust a rate of the OPU frame. This is simple to implement and has high flexibility.

In some other implementations, a quantity of payload blocks included in a TUflex frame and a quantity of payload blocks included in a transmission period of an OPU frame may be simultaneously adjusted, to flexibly and accurately adjust the rate of the OPU frame. Details of a specific adjustment manner are not described herein.

A second aspect of the embodiments of this application provides an optical signal transmission device, which may include a mapping unit, configured to map a first optical data unit frame to a first TUflex frame, where the first TUflex frame includes a plurality of payload blocks; map the first TUflex frame to a first OPU frame, where the plurality of payload blocks included in the first TUflex frame are distributed in a payload area of the first OPU frame; map the first OPU frame to a second optical data unit frame, where a bit rate of the second optical data unit frame is greater than a bit rate of the first optical data unit frame; and map the second optical data unit frame to a first optical transport unit frame; and a transceiver unit, configured to send the first optical transport unit frame.

For function implementation details of the foregoing functional units in the optical signal transmission device, refer to, for example, the related detailed descriptions of the optical signal transmission method provided in the first aspect.

A third aspect of the embodiments of this application provides an optical signal transmission device, including a processor and a memory coupled to each other. The processor is configured to invoke a computer program stored in the memory to perform some or all of the steps of any optical signal transmission method provided in the first aspect.

A fourth aspect of the embodiments of this application provides a computer-readable storage medium. The computer-readable storage medium stores a computer program; and when the computer program is executed by hardware, some or all of the steps of any optical signal transmission method provided in the first aspect can be completed.

A fifth aspect of the embodiments of this application provides a communication apparatus, including at least one input end, a signal processor, and at least one output end. The signal processor is configured to perform some or all of the steps of any optical signal transmission method provided in the first aspect.

A sixth aspect of the embodiments of this application provides a communication apparatus, including an input interface circuit, a logic circuit, and an output interface circuit. The logic circuit is configured to perform some or all of the steps of any optical signal transmission method provided in the first aspect.

A seventh aspect of the embodiments of this application provides a chip system. The chip system includes a processor, configured to support an optical signal transmission device in implementing some or all of the steps of any optical signal transmission method provided in the first aspect.

An eighth aspect of the embodiments of this application provides a computer program product including instructions. When the computer program product is run on an optical signal transmission device, the optical signal transmission device is enabled to perform some or all of the steps of any of the methods in the foregoing aspects.

BRIEF DESCRIPTION OF DRAWINGS

The following describes some accompanying drawings related to the embodiments of this application.

FIG. 6C is a schematic diagram of an example of a meaning of each byte in an MSI according to an embodiment of this application;

FIG. 6D is a schematic diagram of another example of a meaning of each byte in an MSI according to an embodiment of this application;

DESCRIPTION OF EMBODIMENTS

The following describes embodiments of this application with reference to the accompanying drawings in embodiments of this application.

Figures 1A, 1B:
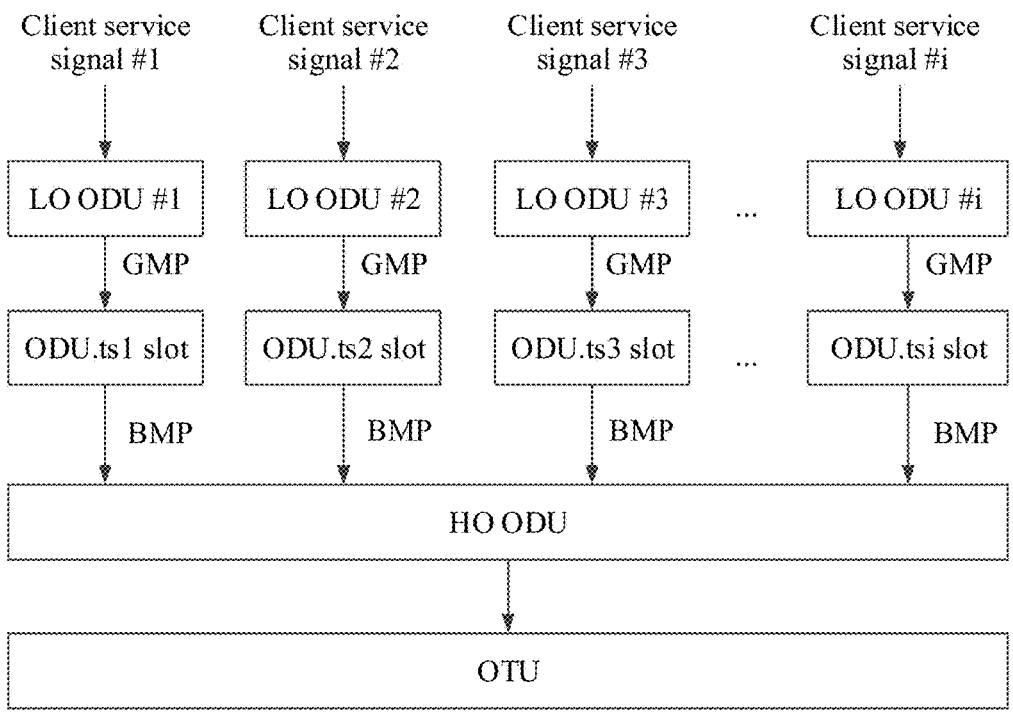
FIG. 1A is a schematic diagram of a modular structure of an OTU frame according to an embodiment of this application.
FIG. 1B is a schematic diagram of mapping a client service signal at a tributary slot granularity according to an embodiment of this application.

FIG. 1A illustrates a modular structure of an optical transport unit (OTU) frame of 4(rows)×4080(columns). The OTU frame may include a payload area and an overhead ("OH") area. The overhead area may also be referred to as an overhead byte. The payload area may also be referred to as a payload byte.

The OTU frame includes a frame alignment signal (FAS), and the FAS can provide a synchronous frame positioning function. A forward error correction (FEC) byte provides error detection and error correction functions. OTUk OH represents the overhead byte of the OTU frame, and the OTUk OH can provide a network management function of an optical transport unit level. ODUk OH represents an overhead byte of an ODU, and the ODUk OH is used to provide related maintenance and operation functions. OPUk OH represents an overhead byte of an OPU, and the OPUk OH is used to provide a function of adapting to a client service signal. An optical payload unit OPUk is configured to provide a function of bearing a client service signal.

Coefficients k in the OPUk, the ODUk, and the OTUk are used to indicate different supported bit rates of an OPU, an ODU, and an OTU. For example, when k=0, it indicates that the bit rate is 1.25 Gbit/s; when k=1, it indicates that the bit rate is 2.5 Gbit/s; when k=2, it indicates that the bit rate is 10 Gbit/s; when k=3, it indicates that the bit rate is 40 Gbit/s; when k=4, it indicates that the bit rate is 100 Gbit/s; when k=Cn, it indicates that the bit rate is n*100 Gbit/s; and when k=flex, it indicates that the bit rate is n*1.25 Gbit/s (n≥2).

It should be noted that a frame structure of an OTUCn does not include the FEC, and the OTUCn includes n OTUC frames, and is finally sent by mapping the OTUCn to a FlexO (Flexible OTN) interface.

Currently, a rate of an OTN interface has about a 5% rate increase relative to a rate of an Ethernet interface of a same rate level, for example, a 100 G OTU4 relative to 100 GE Ethernet, or a 400 G OTUC4 and FlexO-4 relative to 400 GE Ethernet. As an interface rate develops to a higher rate, the rate difference of about 5% causes a great difference in an optical digital processing chip and optical module design. An external performance is that power consumption and costs of the OTN interface greatly increase relative to the Ethernet interface of a same rate level, and competitiveness of the OTN interface is reduced.

The One of main reasons for the rate increase of about 5% in the OTN interface is that a rigid tributary slot division manner is used. When a plurality of client services is mapped and multiplexed, bandwidths allocated to some client services may have relatively large bandwidth redundancy, which causes bandwidth waste and an increase in a final total rate of an output interface.

Therefore, to improve competitiveness of an OTN, providing a customized application scenario and improving interface bandwidth efficiency are of great application values. For example, in some scenarios, the OTN interface may be similar to an interface without rate speedup. A rate of an Ethernet interface with a same rate is used, and an optical module with a same rate is used, to reduce overall network costs. Alternatively, in some scenarios, a customized rate is used for the OTN interface based on an application distance of an optical module. The rate of the OTN interface may be flexibly changed in a specific range based on a specific application scenario, and this change has no impact on an original service bearing capability.

Referring to FIG. 1B, in some conventional optical transport solutions, a plurality of client service signals is mapped by using a fixed tributary slot as a mapping granularity. The OTUk/OTUCn provides the following several types of transmission manners with a fixed tributary slot. In a transmission manner with a 2.5 G tributary slot, a payload area of the OTUk is divided into a fixed quantity of 2.5 G tributary slots, and a plurality of client services are mapped and multiplexed through asynchronous mapping. In a transmission manner with a 1.25 G tributary slot, the payload area of the OTUk is divided into a fixed quantity of 1.25 G tributary slots, and a plurality of client services are mapped and multiplexed by using a universal mapping procedure. In a transmission manner with a 5G tributary slot, a payload area of the OTUCn is divided into 20n 5G tributary slots, and a plurality of client services are mapped and multiplexed by using a universal mapping procedure. However, when a rate needs to be adjusted, if the rate is reduced based on an OTUk/OTUCn interface, if a rate of a tributary slot included in the OTUk/OTUCn interface is reduced by a same proportion, some client services may not be effectively borne when occupying a same quantity of tributary slots. It may be learned that problems such as bandwidth waste exists in the transmission manner with a fixed tributary slot. In addition, in the transmission manner with a fixed slot, a rate of a line interface cannot be adjusted flexibly. If the rate is adjusted, the original plurality of client services may be no longer effectively borne.

Therefore, the embodiments of this application disclose a new optical signal transmission manner, to improve bandwidth utilization and provide a capability of flexibly adjusting a transmission rate.

Figure 2A:
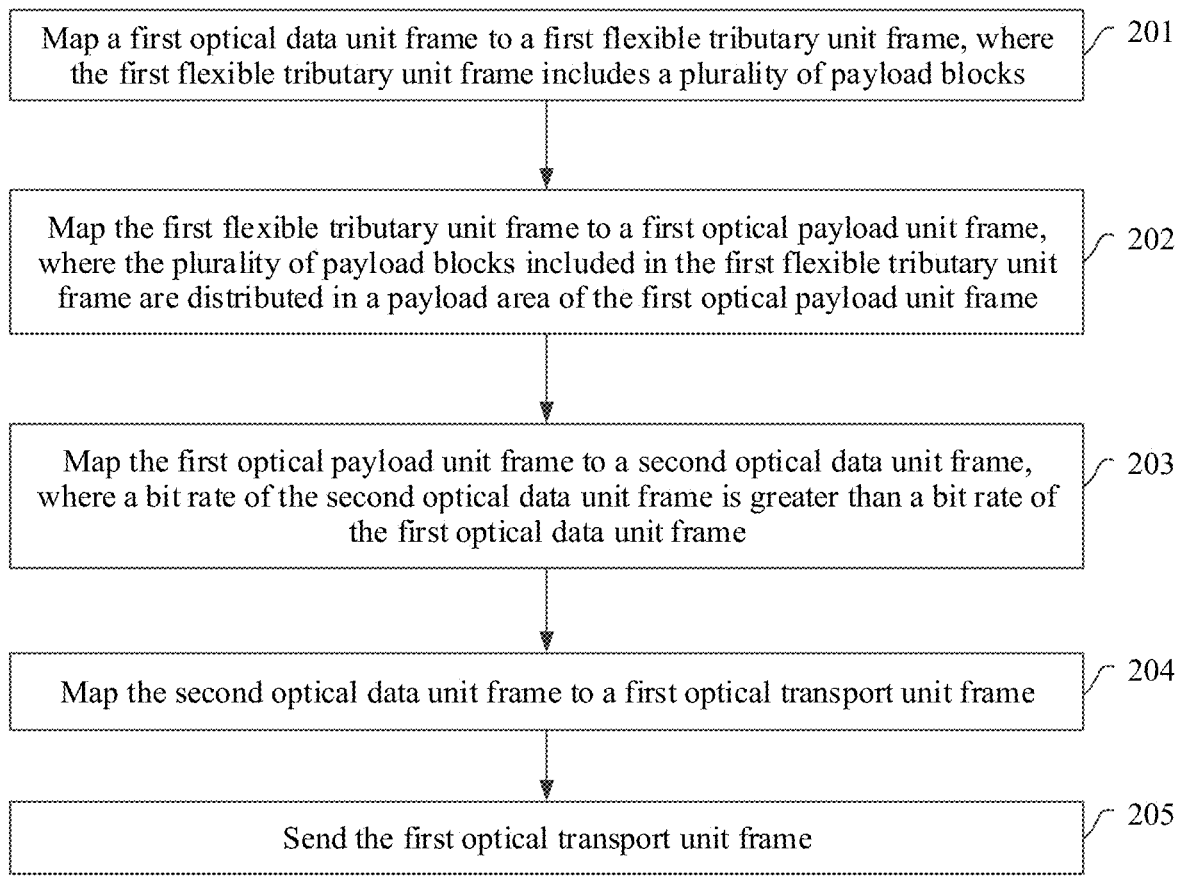
FIG. 2A is a schematic flowchart of an optical signal transmission method according to an embodiment of this application.

FIG. 2A is a schematic flowchart of an optical signal transmission method according to an embodiment of this application. As shown in FIG. 2A, the optical signal transmission method may include the following steps.

201. Map a first optical data unit frame to a first flexible tributary unit frame, where the first flexible tributary unit frame includes a plurality of payload blocks.

The first flexible tributary unit frame may be, for example, a TUflex (Flexible Tributary Unit) frame. The TUflex frame in this embodiment of this application may include one or more payload blocks, and each payload block in the TUflex frame has a size of Y bits (Y is a positive integer). Compared with another flexible tributary unit frame including one or more fixed tributary slots, a bit rate of the TUflex frame including one or more payload blocks may have more flexible adjustment space, because a granularity of the payload block is far smaller than that of the tributary slot, the payload block in the TUflex frame may be designed to any size based on a requirement, and the payload block may be set to different sizes based on different transmission periods.

There may be various specific manners of mapping the first optical data unit frame to the first TUflex frame. For example, the mapping a first optical data unit frame to a first TUflex frame may include splitting the first optical data unit frame into a plurality of X-bit code blocks (that is, a code block with a size of X bits), and forming an X-bit code block stream; and mapping C1 consecutive X-bit code blocks in the X-bit code block stream to the first TUflex frame, where the C1 X-bit code blocks are in a one-to-one correspondence with C1 payload blocks included in the first TUflex frame (the one-to-one correspondence indicates that one X-bit code block is mapped to one payload block, that is, different X-bit code blocks are mapped to different payload blocks).

202. Map the first TUflex frame to a first OPU frame, where the plurality of payload blocks included in the first TUflex frame are distributed in a payload area of the first OPU frame.

It may be understood that the payload block in the payload area of the first OPU frame may only come from the payload block in the first TUflex frame. Certainly, the payload block in the payload area of the first OPU frame may not only come from the payload block in the first TUflex frame, but also may come from another optical signal container.

A distribution manner, in the payload area of the first OPU frame, of the plurality of payload blocks included in the first TUflex frame may be uniform distribution or non-uniform distribution. In a case of uniform distribution, a specific uniform distribution manner may be determined by using, but is not limited to, a sigma-delta algorithm.

203. Map the first OPU frame to a second optical data unit frame, where a bit rate of the second optical data unit frame is greater than a bit rate of the first optical data unit frame.

The first optical data unit frame is, for example, a low-order ODU frame, such as an LO ODUj or ODUflex frame.

The first OPU frame may be, for example, a HO OPU frame, and the HO OPU frame may be, for example, an OPU1 frame, an OPU2 frame, an OPU3 frame, an OPU4 frame, or an OPUCn frame. The second optical data unit frame may be, for example, a HO ODU frame.

204. Map the second optical data unit frame to a first optical transport unit frame.

205. Send the first optical transport unit frame.

It may be learned that in this embodiment, a payload block may be used as a mapping granularity in a payload area of an OPU frame. Because a granularity size of the payload block is far smaller than a granularity size of a tributary slot, compared with a solution in which the tributary slot is used as a mapping granularity, the technical solution in this embodiment helps improve bandwidth utilization and flexibility in adjustment of a transmission rate of a client service signal.

It may be understood that the first optical data unit frame may include N optical data unit frames, and the splitting the first optical data unit frame into X-bit code blocks and forming an X-bit code block stream includes splitting the first optical data unit frame into M X-bit code blocks and forming the X-bit code block stream. X is an integer multiple of 64, for example, $X=N*64$. M and N are positive integers.

When frame alignment needs to be performed, M is, for example, equal to 239. M may alternatively be equal to 478, 100, 250, 500, or another value. N may be, for example, equal to 1, 2, 3, 4, 5, 6, 7, 8, 10, 12, 19, 20, 50, 100, 200, 500, or another value.

When N is greater than 1, an overhead area of the first OPU frame may carry a multiframe identifier, and the multiframe identifier is used to indicate an arrangement location of a current optical data unit frame in the N optical data unit frames (that is, the multiframe identifier is used to indicate a specific frame that is the current optical data unit frame in the N optical data unit frames). For example, assuming that N is equal to 3, the multiframe identifier may be used to indicate that the current optical data unit frame is the first frame, the second frame, or the third frame in the three optical data unit frames; or assuming that N is equal to 2, the multiframe identifier may be used to indicate that the current optical data unit frame is the first frame or the second frame in the two optical data unit frames. Another case may be obtained by analogy.

Figure 2B:
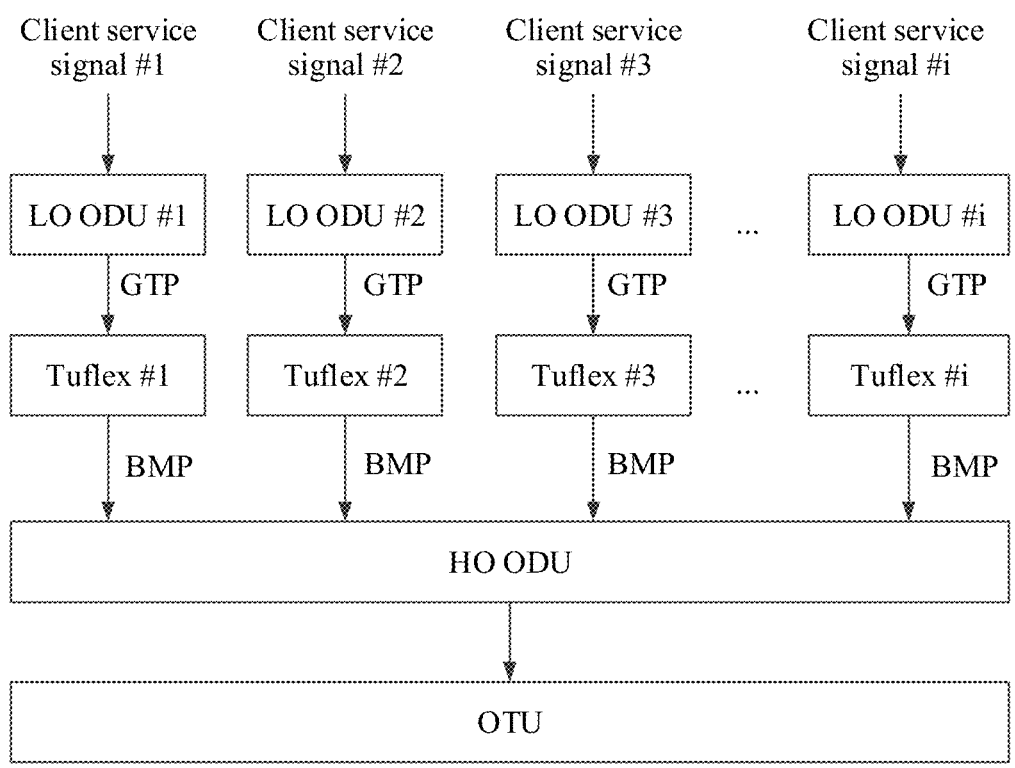
FIG. 2B is a schematic diagram of mapping a client service signal at a payload block granularity according to an embodiment of this application.
Figure 2C:
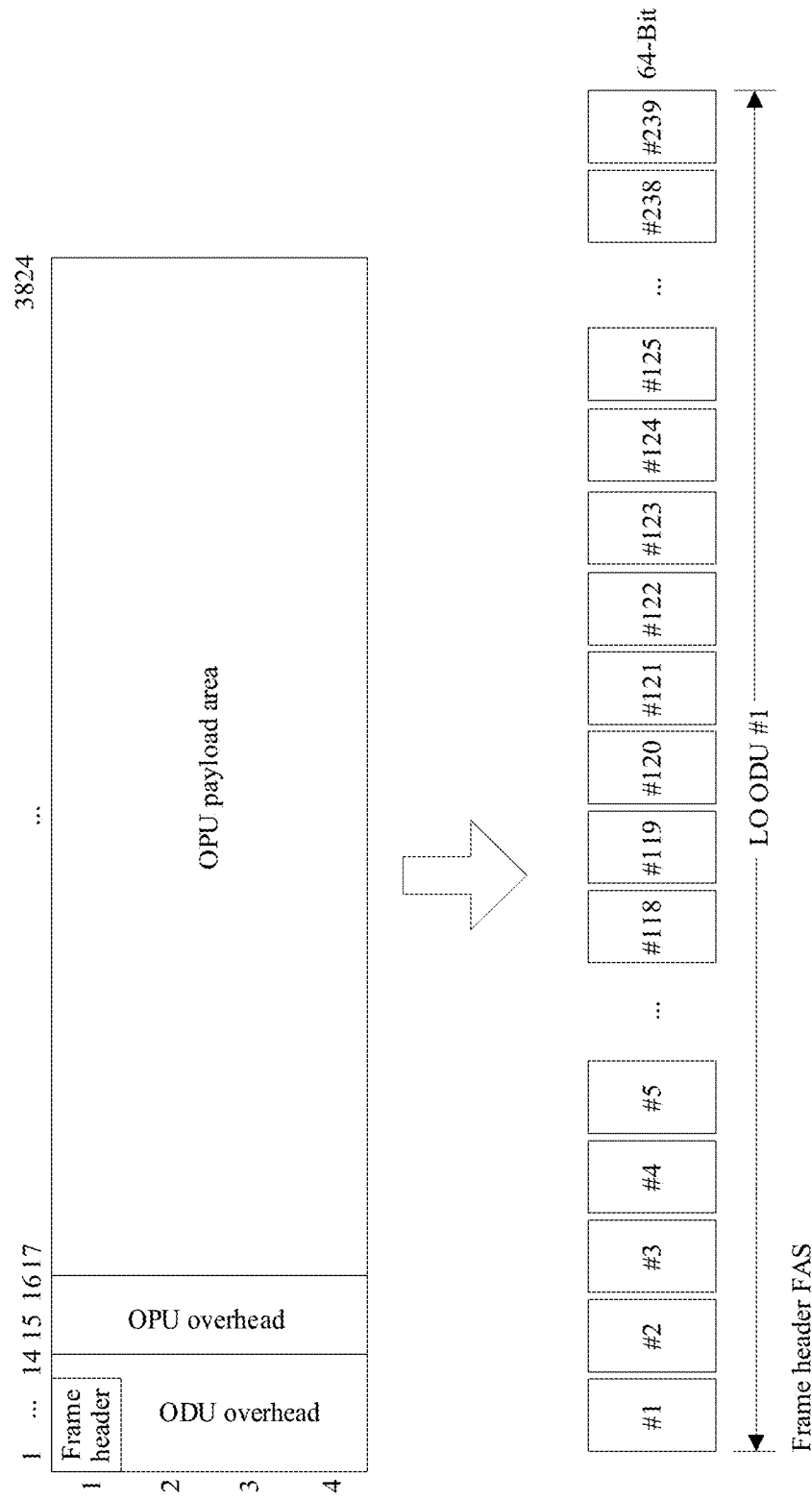
FIG. 2C to FIG. 2F are schematic diagrams of several types of code block splitting of an ODU according to an embodiment of this application.

In an example, referring to FIG. 2C, the first optical data unit frame includes one optical data unit frame, and the splitting the first optical data unit frame into X-Bit code blocks and forming an X-bit code block stream may include splitting the first optical data unit frame into 239 X-Bit code blocks and forming the code block stream. For example, $X=64$.

Figure 2D:
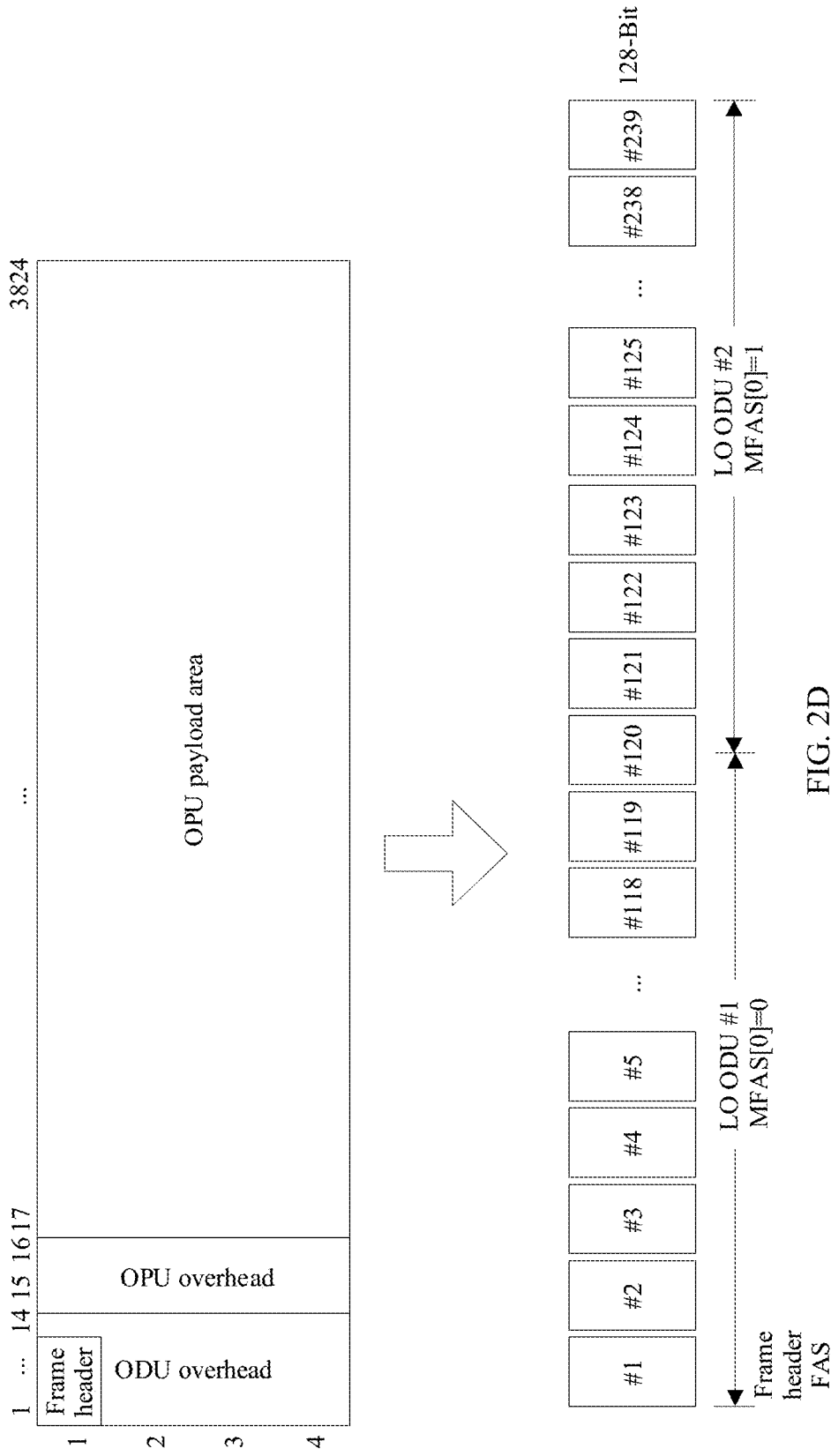

For another example, referring to FIG. 2D, the first optical data unit frame includes two optical data unit frames, and the splitting the first optical data unit frame into X-Bit code blocks and forming an X-bit code block stream may include splitting the first optical data unit frame into 239 X-Bit code blocks and forming the X-bit code block stream. For example, $X=128$. The overhead area of the first OPU frame may carry a multiframe identifier, and the multiframe identifier is used to indicate an arrangement location of a current optical data unit frame in the two optical data unit frames. The multiframe identifier may be, for example, a multiframe alignment signal MFAS or an optical multiframe identifier OMFI. When the multiframe identifier includes the multiframe alignment signal MFAS, for example, a least significant 1 bit of the MFAS is used to indicate the arrangement location of the current frame in the two optical data unit frames. Alternatively, when the multiframe identifier includes the optical multiframe identifier (OMFI), the OMFI is used to indicate the arrangement location of the current frame in the two optical data unit frames.

Figure 2E:
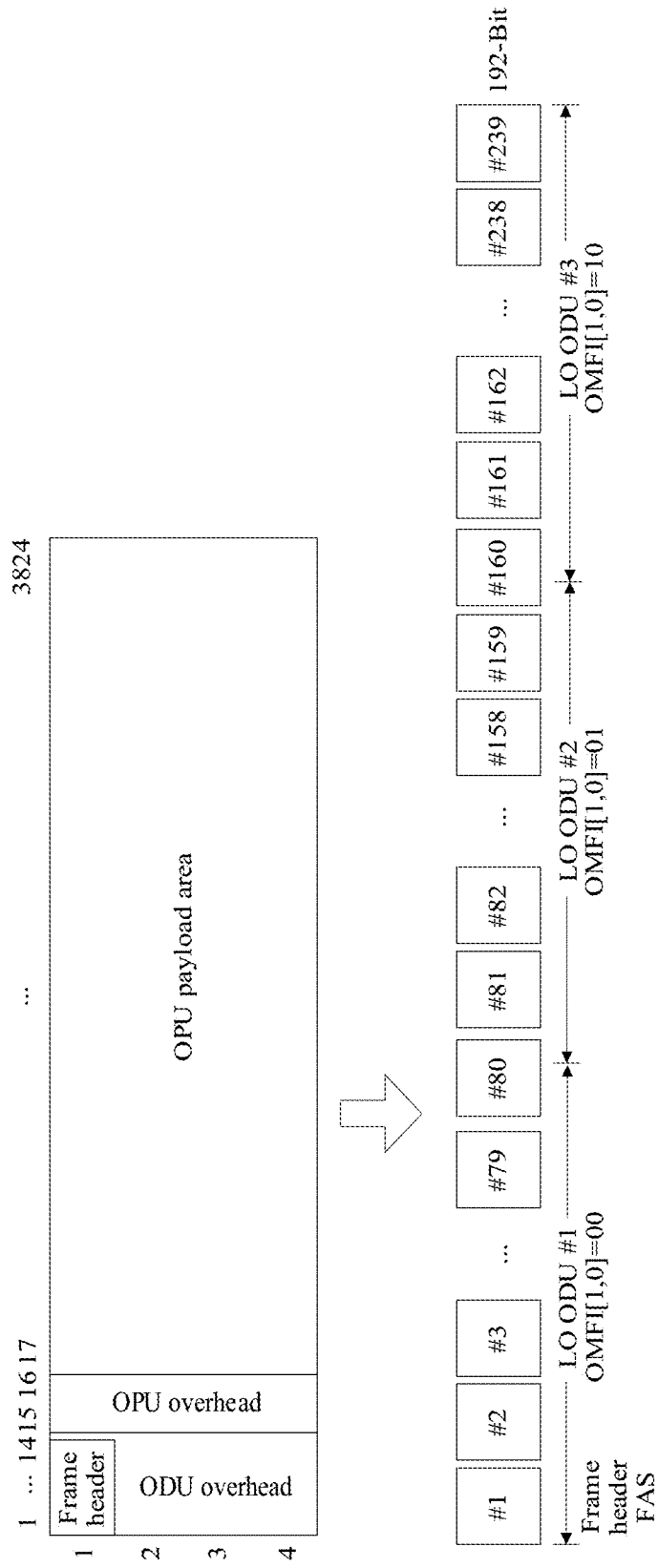

For another example, referring to FIG. 2E, the first optical data unit frame includes three optical data unit frames, and the splitting the first optical data unit frame into X-bit code blocks and forming an X-bit code block stream includes splitting the first optical data unit frame into 239 X-Bit code blocks and forming the X-bit code block stream. For example, X=192. The overhead area of the first OPU frame may carry a multiframe identifier. For details, refer to the related descriptions in FIG. 2-D. The details are not described again. A difference lies in the following. In this application, least significant 2 bits of the MFAS are used to indicate the arrangement location of the current frame in the three optical data unit frames.

Figure 2F:
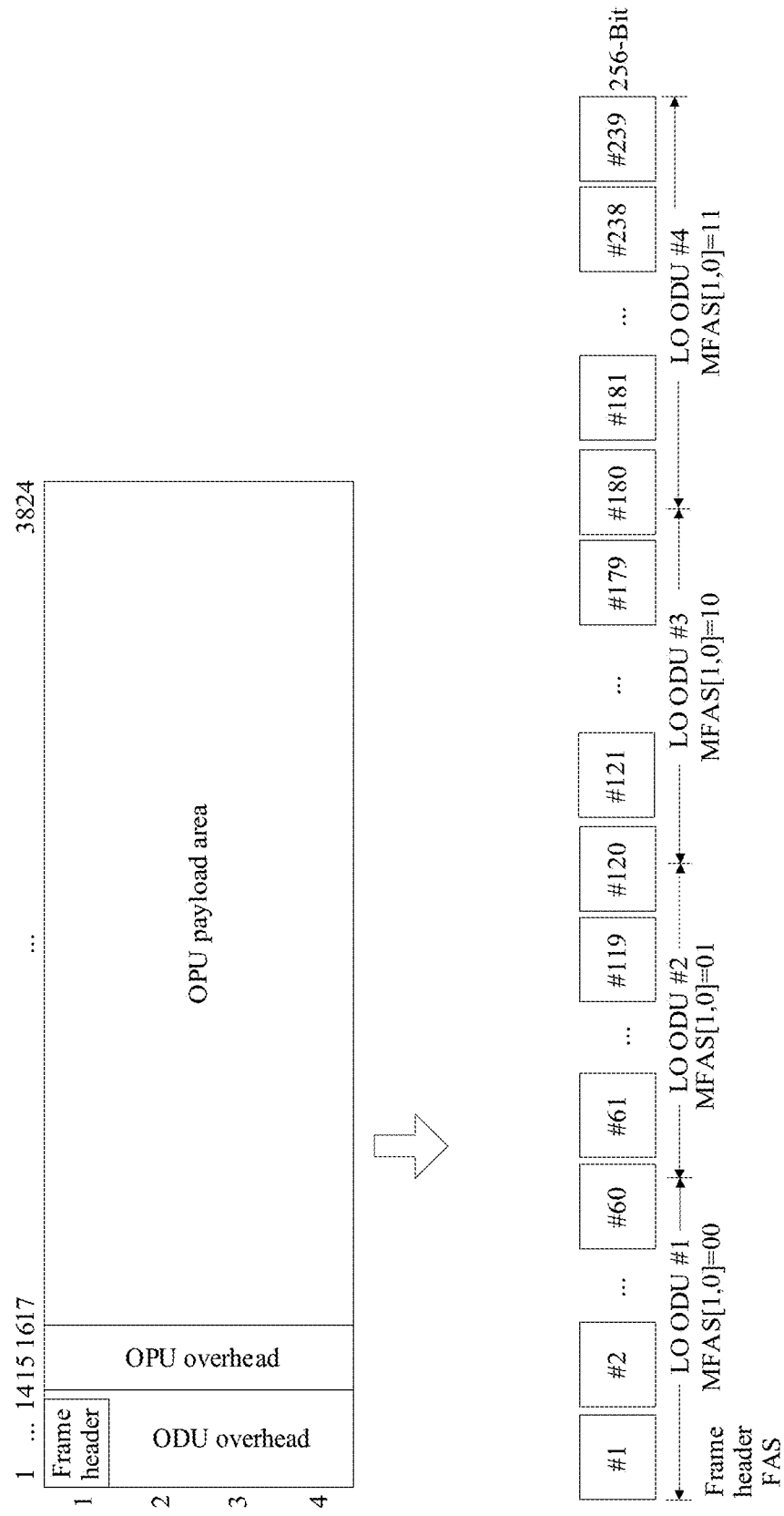

For another example, referring to FIG. 2F, the first optical data unit frame includes four optical data unit frames, and the splitting the first optical data unit frame into X-Bit code blocks and forming an X-bit code block stream includes splitting the first optical data unit frame into 239 X-Bit code blocks and forming the X-bit code block stream. For example, X=256. The overhead area of the first OPU frame may carry a multiframe identifier. For details, refer to the related descriptions in FIG. 2E. The details are not described herein again.

A case in which N is another value may be obtained by analogy.

In some possible implementations, each of the plurality of payload blocks included in the first TUflex frame carries a client service identifier of the first optical data unit frame. The client service identifier may be used to identify a client service to which the payload block belongs. The client service identifier may be, for example, a tributary port number (TPN, Tributary Port Number). When the payload block carries the client service identifier of the first optical data unit frame, Y>X, that is, a size of a payload block is greater than a size of an X-bit code block. The TPN may also be referred to as a tributary port identifier (TPID) or another name.

In some possible implementations, the first OPU frame carries an overhead identifier. The overhead identifier is used to indicate distribution locations that are of the plurality of payload blocks included in the first TUflex frame and that are in the payload area of the first OPU frame. Therefore, based on the overhead identifier, a receive end can determine the distribution locations that are of the plurality of payload blocks included in the first TUflex frame and that are in the payload area of the first OPU frame. The overhead identifier may be carried in the overhead area of the first OPU frame, or the overhead identifier may be carried in at least one payload block in the first OPU frame (for example, the overhead identifier may be carried in a specific payload block in the first OPU frame).

Certainly, if the distribution locations that are of the plurality of payload blocks included in the first TUflex frame and that are in the payload area of the first OPU frame are agreed by default, the first OPU frame may not need to carry the overhead identifier, and the receive end may determine, based on an agreement made by default, the distribution locations that are of the plurality of payload blocks included in the first TUflex frame and that are in the payload area of the first OPU frame.

In some implementations, when a rate needs to be adjusted, the method further includes mapping a third optical data unit frame to a second TUflex frame, where the second TUflex frame includes C2 payload blocks; mapping the second TUflex frame to a second OPU frame, where the C2 payload blocks included in the second TUflex frame are distributed in a payload area of the second OPU frame, C2=C1*R1/R2, R1 is a bit rate of the first OPU frame, R2 is a bit rate of the second OPU frame, C1 is a quantity of payload blocks included in the first TUflex frame, and the third optical data unit frame and the first optical data unit frame are used to bear service data of a same client; mapping the second OPU frame to a fourth optical data unit frame, where a bit rate of the fourth optical data unit frame is greater than a bit rate of the third optical data unit frame; mapping the fourth optical data unit frame to a second optical transport unit frame; and sending the second optical transport unit frame.

In some other implementations, when a rate needs to be adjusted, the method further includes mapping a third optical data unit frame to a second TUflex frame; mapping the second TUflex frame to a second OPU frame, where a plurality of payload blocks included in the second TUflex frame are distributed in a payload area of the second OPU frame, P2=P1*R2/R1, R1 is a bit rate of the first OPU frame, R2 is a bit rate of the second OPU frame, P1 is a quantity of payload blocks included in a transmission period of the first OPU frame, P2 is a quantity of payload blocks included in a transmission period of the second OPU frame, a quantity of payload blocks included in the second TUflex frame is the same as a quantity of payload blocks included in the first TUflex frame (for example, the quantities of payload blocks both are C1), and the third optical data unit frame and the first optical data unit frame are used to bear service data of a same client; mapping the second OPU frame to a fourth optical data unit frame, where a bit rate of the fourth optical data unit frame is greater than a bit rate of the third optical data unit frame; mapping the fourth optical data unit frame to a second optical transport unit frame; and sending the second optical transport unit frame.

It may be learned that in the two rate adjustment manners enumerated above, a quantity of payload blocks included in a TUflex frame or a quantity of payload blocks included in a transmission period of an OPU frame is adjusted, to flexibly and accurately adjust a rate of the OPU frame. This is simple to implement and has high flexibility.

In some other implementations, a quantity of payload blocks included in a TUflex frame and a quantity of payload blocks included in a transmission period of an OPU frame may be simultaneously adjusted, to flexibly and accurately adjust the rate of the OPU frame. Details of a specific adjustment manner are not described herein.

It may be understood that the foregoing optical signal transmission method is applied to a transmit end in an optical signal transmission system. Referring to FIG. 2B, the transmit end maps one or more client service signals level-by-level, to finally obtain an OTU frame. After receiving the OTU frame, a receive end may perform demapping level-by-level in a corresponding manner, to finally obtain one or more client service signals.

The following provides further descriptions by using several specific application scenarios.

Figure 3A:
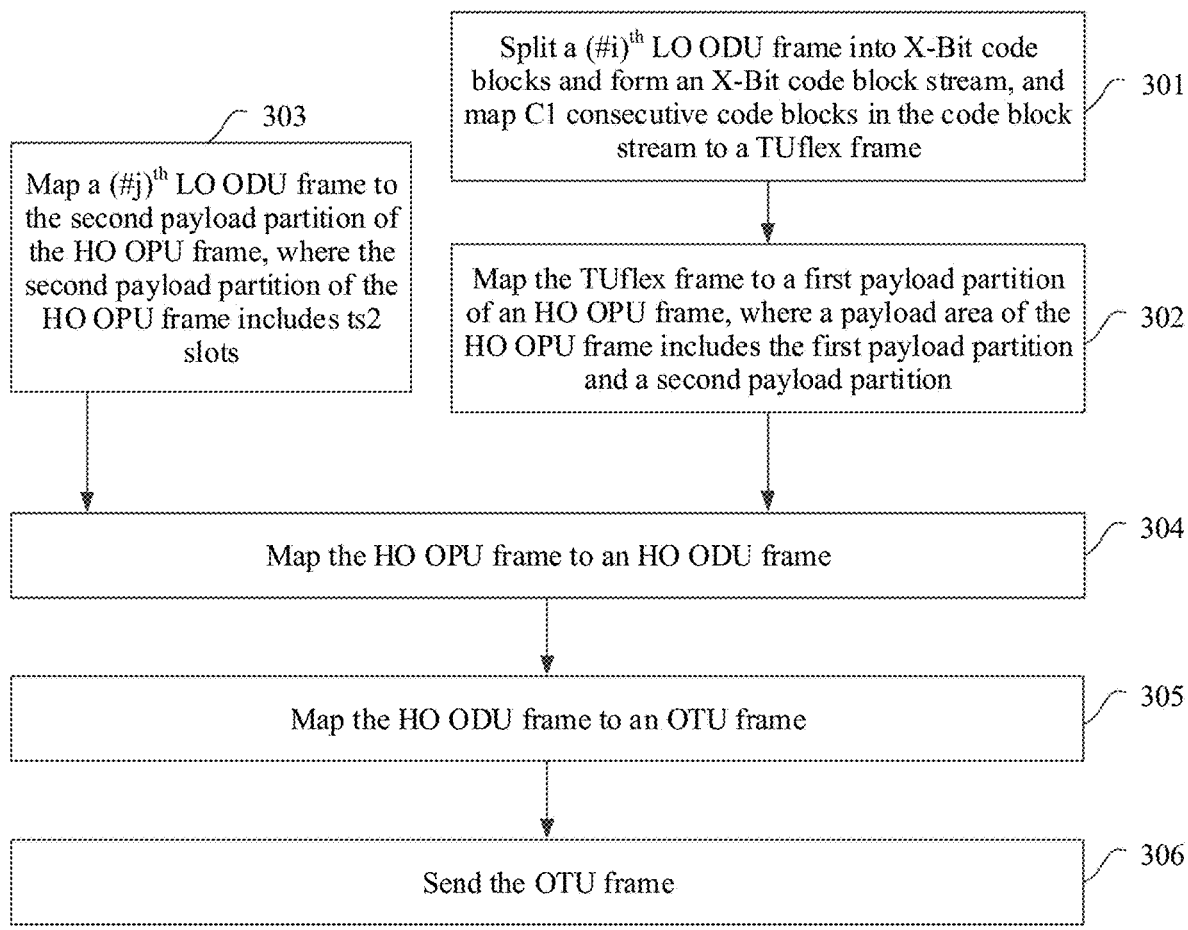
FIG. 3A is a schematic flowchart of another optical signal transmission method according to an embodiment of this application.

FIG. 3A is a schematic flowchart of another optical signal transmission method according to an embodiment of this application. A payload area of an HO OPU frame in this embodiment includes a first payload partition and a second payload partition. Different mapping procedures may be used in the first payload partition and the second payload partition. The other optical signal transmission method may include the following steps.

301. Split a $(\#i)^{th}$ LO ODU frame into X-Bit code blocks and form an X-bit code block stream, and map C1 consecutive X-bit code blocks in the X-bit code block stream to a TUflex frame.

302. Map the TUflex frame to the first payload partition of the HO OPU frame. A plurality of payload blocks included in the TUflex frame are distributed in a plurality of payload blocks in the first payload partition of the HO OPU frame. The first payload partition of the HO OPU frame includes ts1 tributary slots.

The HO OPU frame may be, for example, an OPU1 frame, an OPU2 frame, an OPU3 frame, an OPU4 frame, or an OPUCn frame.

303. Map a $(\#j)^{th}$ LO ODU frame to the second payload partition of the HO OPU frame, where the second payload partition of the HO OPU frame includes ts2 tributary slots.

It may be understood that there is no inevitable execution sequence between steps 301 and 302 and step 303. Step 303 and the steps 301 and 302 may be performed in parallel. The $(\#J)^{th}$ LO ODU frame and the $(\#i)^{th}$ LO ODU frame correspond to different client service signals.

Figure 3B:
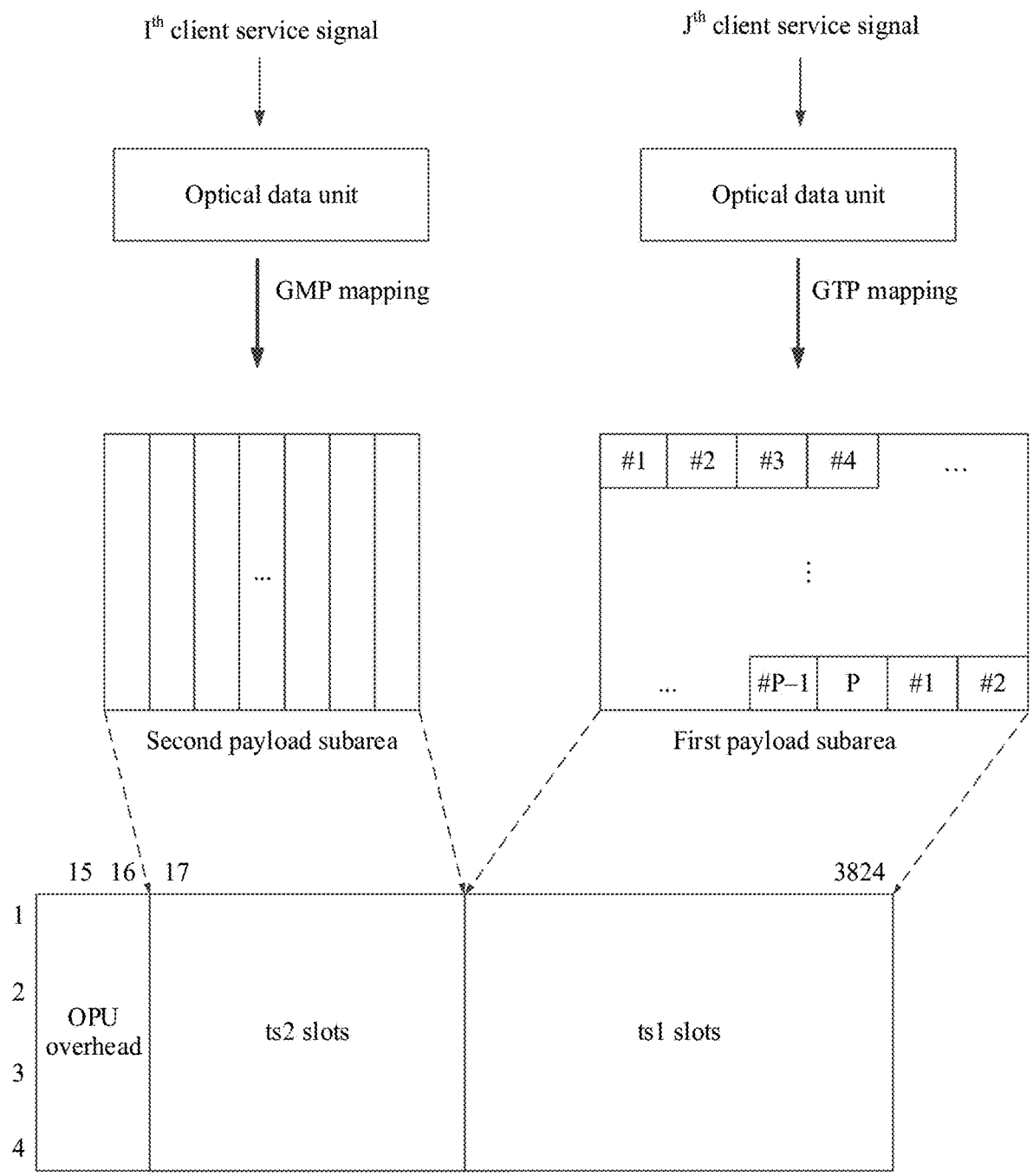
FIG. 3B and FIG. 3C are two schematic diagrams of hybrid mapping according to an embodiment of this application.

FIG. 3B illustrates that the payload area of the HO OPU frame includes the first payload partition and the second payload partition. The first payload partition includes ts1 tributary slots of the HO OPU frame, the second payload partition includes ts2 tributary slots of the HO OPU frame, and the first payload partition is divided into a plurality of payload blocks. For example, different mapping procedures are used in the first payload partition and the second payload partition. For example, a mapping procedure used in the first payload partition is a generic mapping procedure (GMP), and a mapping procedure used in the second payload partition is a generic tributary unit procedure (GTP). The GTP may also be referred to as a flexible tributary unit procedure (FTP).

Figure 3C:
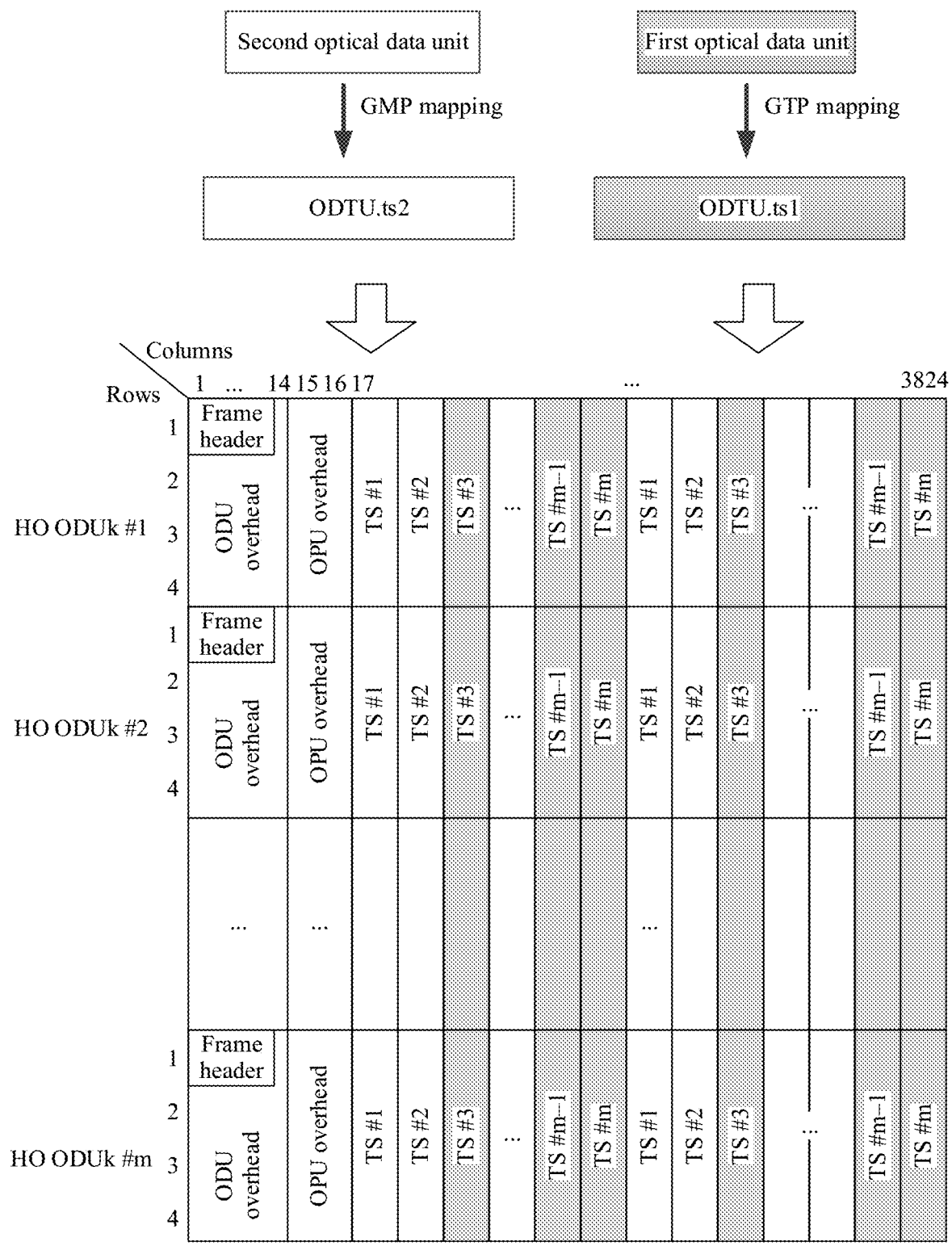
Figure 3D:
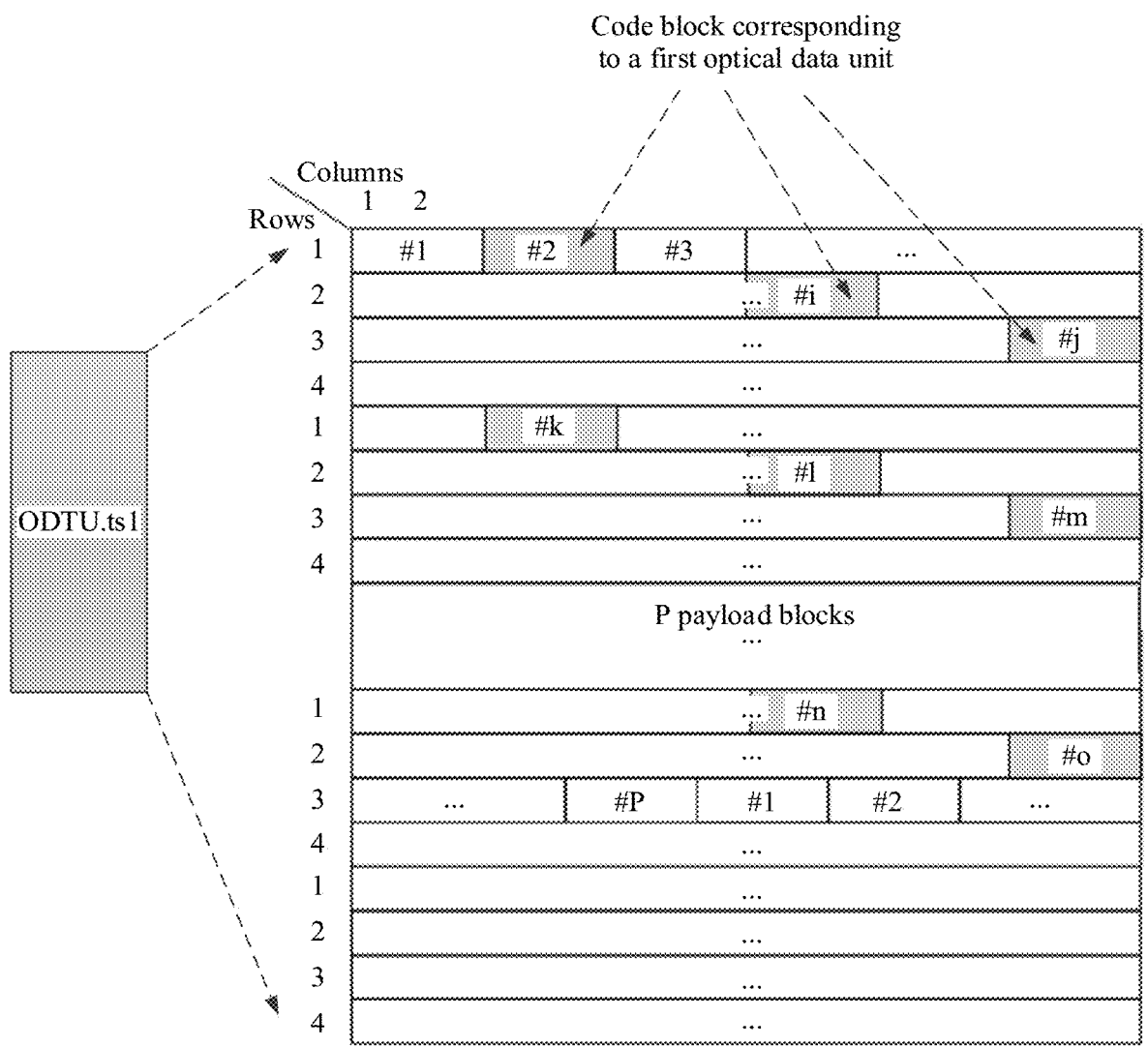
FIG. 3D is a schematic diagram of uniform payload block mapping according to an embodiment of this application.

FIG. 3C illustrates that tributary slots forming the first payload partition and the second payload partition may be not consecutive. FIG. 3D illustrates that the plurality of payload blocks included in the TUflex frame are uniformly distributed in the first payload partition of the HO OPU frame.

304. Map the HO OPU frame to a HO ODU frame.

305. Map the HO ODU frame to an OTU frame.

306. Send the OTU frame.

It may be understood that the solution in this embodiment is mainly described by using an example in which an OPU frame is the HO OPU frame, a lower-rate ODU frame is the LO ODU frame (for example, the LO ODU frame is, in an example, an LO ODUj/flex frame), and a higher-rate ODU frame is the HO ODU frame. Certainly, an implementation in a case in which the OPU frame is another type of OPU frame, the lower-rate ODU frame is another type of ODU frame, and the higher-rate ODU frame is another type of ODU frame may be obtained by analogy.

It may be learned that a hybrid mapping mechanism is introduced in this embodiment, that is, the payload area of the HO OPU frame includes the first payload partition and the second payload partition. Different mapping procedures may be used in the first payload partition and the second payload partition. For example, a payload block may be used as a mapping granularity in the second payload partition, and a tributary slot may be used as a mapping granularity in the first payload partition. Because different mapping granularities correspond to different transmission rate control flexibility, the hybrid mapping mechanism helps meet diversified requirements of different client services for the mapping granularity, and helps further improve flexibility in control of a transmission rate of the client service.

Figure 4A:
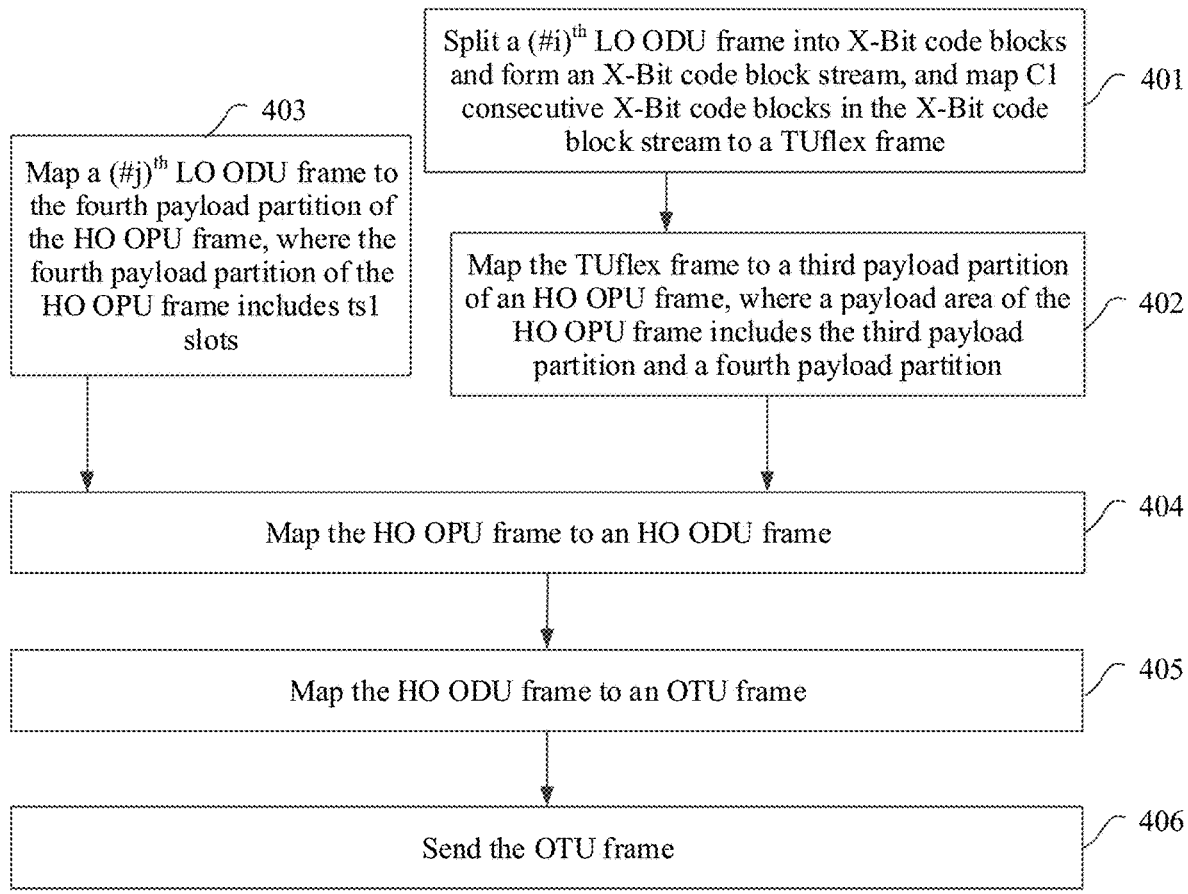
FIG. 4A is a schematic flowchart of another optical signal transmission method according to an embodiment of this application.

FIG. 4A is a schematic flowchart of another optical signal transmission method according to an embodiment of this application. A payload area of an HO OPU frame in this embodiment includes a first payload partition and a second payload partition. Different mapping procedures may be used in the first payload partition and the second payload partition. The another optical signal transmission method may include the following steps.

401. Split a $(\#i)^{th}$ LO ODU frame into X-Bit code blocks and form an X-bit code block stream, and map C1 consecutive X-bit code blocks in the X-bit code block stream to a TUflex frame.

402. Map the TUflex frame to a third payload partition of the HO OPU frame, where the payload area of the HO OPU frame includes the third payload partition and a fourth payload partition. A plurality of payload blocks included in the TUflex frame are distributed in a plurality of payload blocks in the third payload partition of the HO OPU frame.

The HO OPU frame may be, for example, an OPU1 frame, an OPU2 frame, an OPU3 frame, an OPU4 frame, or an OPUCn frame.

403. Map a $(\#j)^{th}$ LO ODU frame to the fourth payload partition of the HO OPU frame, where the fourth payload partition of the HO OPU frame includes ts1 tributary slots.

Figure 4B:
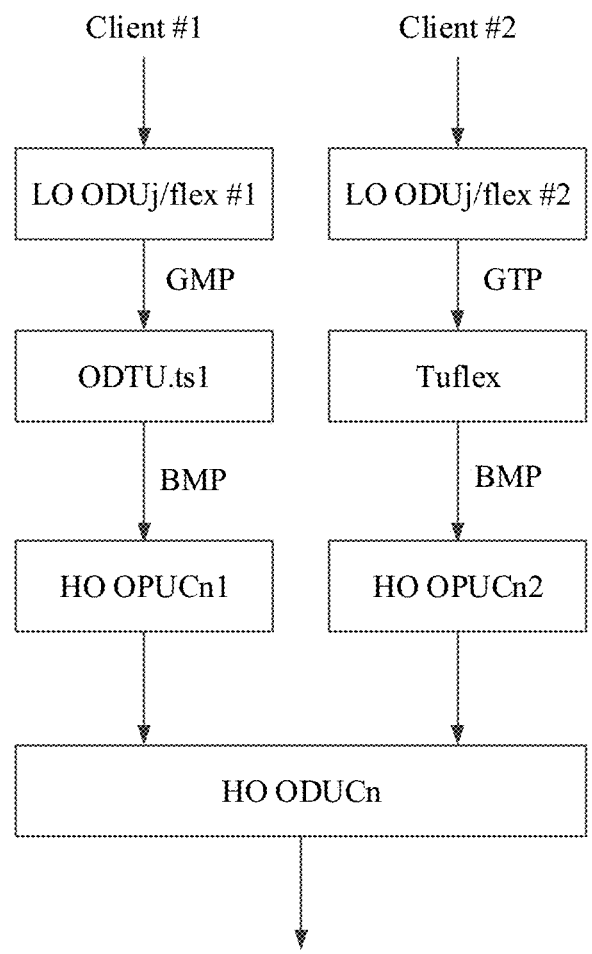
FIG. 4B and FIG. 4C are two schematic diagrams of hybrid mapping according to an embodiment of this application.
Figure 4C:
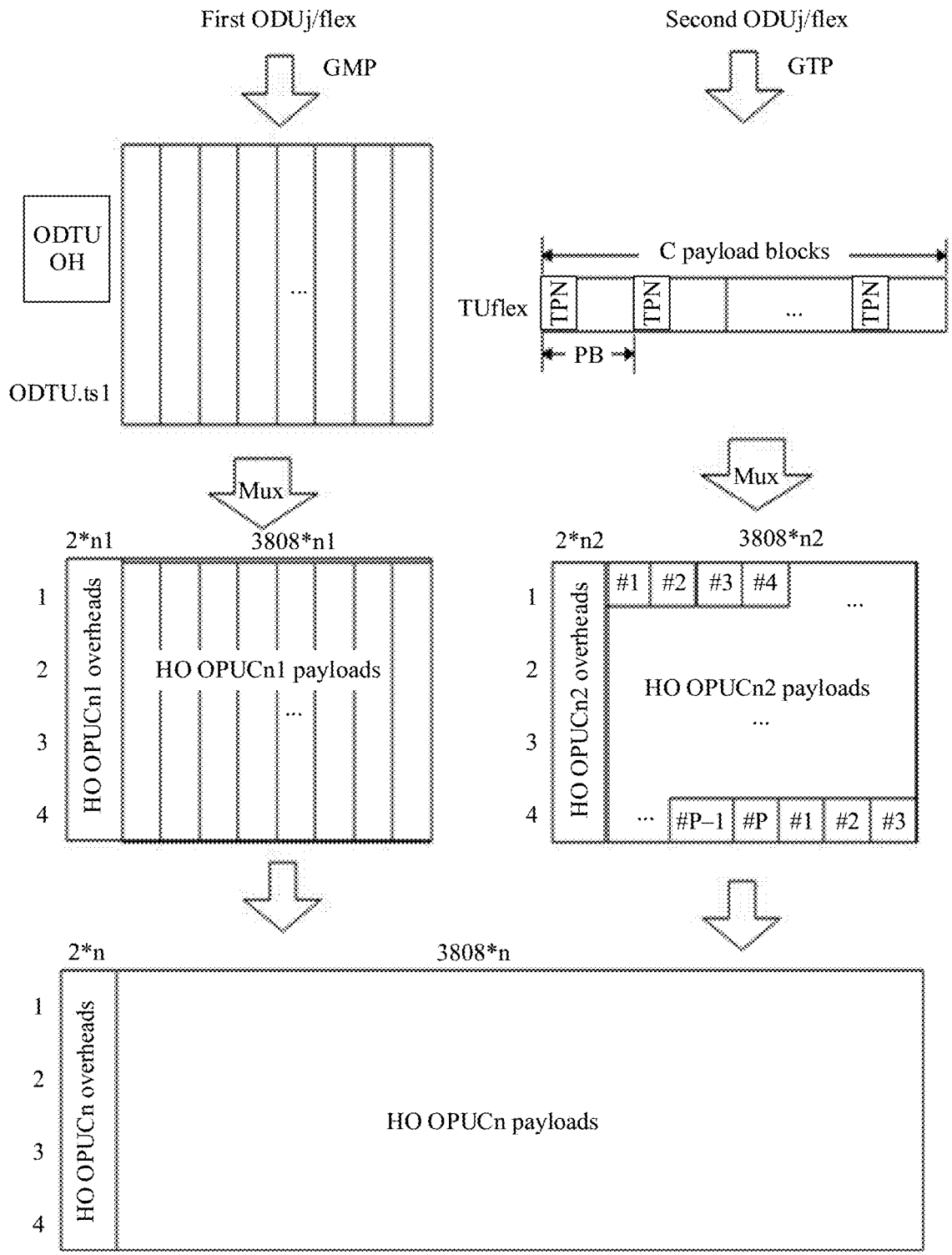

FIG. 4C illustrates that the payload area of the HO OPU frame includes the third payload partition and the fourth payload partition. The third payload partition and the fourth payload partition include different OPUCs. In the example in FIG. 4B, the third payload partition includes an OPUCn1, and the fourth payload partition includes an OPUCn2. For example, different mapping procedures are used in the third payload partition and the fourth payload partition. FIG. 4B illustrates that a mapping procedure used in the third payload partition is a GMP, and a mapping procedure used in the fourth payload partition is a GTP.

404. Map the HO OPU frame to a HO ODU frame.

405. Map the HO ODU frame to an OTU frame.

406. Send the OTU frame.

It may be understood that the solution in this embodiment is mainly described by using an example in which an OPU frame is the HO OPU frame, a lower-rate ODU frame is the LO ODU frame (for example, the LO ODU frame is, in an example, an LO ODUj/flex frame), and a higher-rate ODU frame is the HO ODU frame. Certainly, an implementation in a case in which the OPU frame is another type of OPU frame, the lower-rate ODU frame is another type of ODU frame, and the higher-rate ODU frame is another type of ODU frame may be obtained by analogy.

It may be learned that a hybrid mapping mechanism is introduced in this embodiment, that is, the payload area of the HO OPU frame includes the first payload partition and the second payload partition. Different mapping procedures may be used in the first payload partition and the second payload partition. For example, a payload block may be used as a mapping granularity in the second payload partition, and a tributary slot may be used as a mapping granularity in the first payload partition. Because different mapping granularities correspond to different transmission rate adjustment flexibility, the hybrid mapping mechanism helps meet diversified requirements of different client services for the mapping granularity, and helps further improve flexibility in adjustment of a transmission rate of the client service.

Figure 5A:
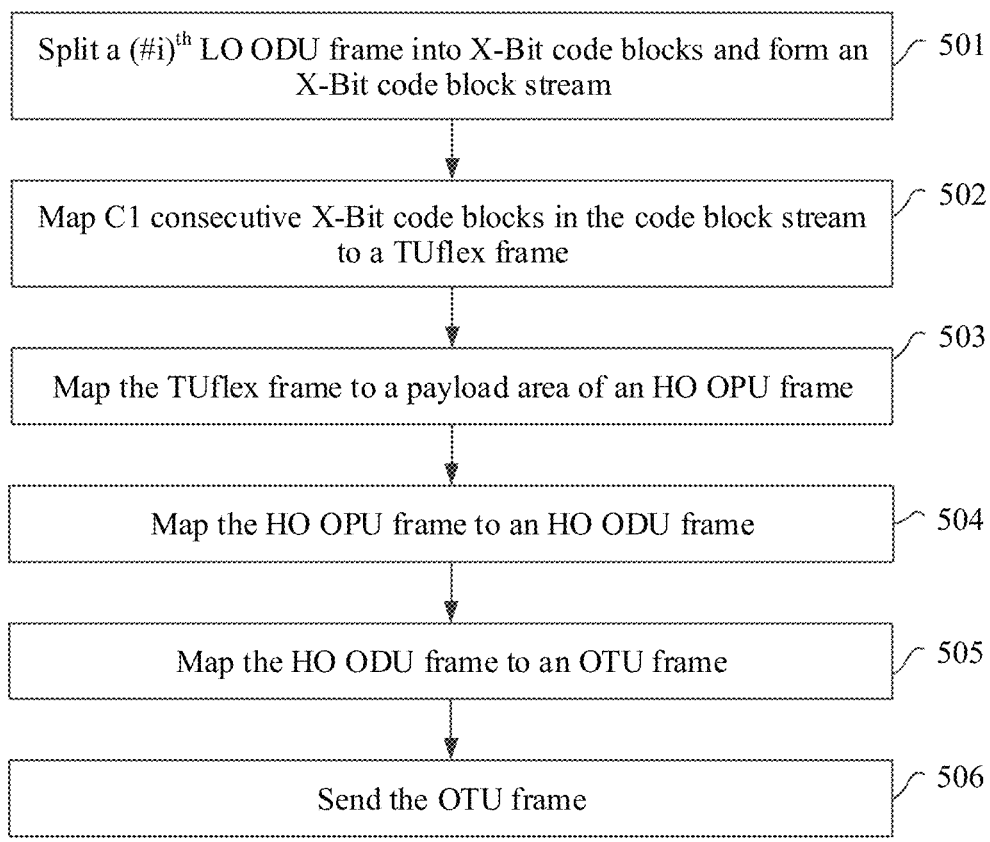
FIG. 5A is a schematic flowchart of another optical signal transmission method according to an embodiment of this application.

FIG. 5A is a schematic flowchart of another optical signal transmission method according to an embodiment of this application. In the solution in this embodiment, a uniform mapping procedure is used in a payload area of an HO OPU frame. The other optical signal transmission method may include the following steps.

501. Split a (#i)$^{th}$ LO ODU frame into X-Bit code blocks and form an X-bit code block stream.

502. Map C1 consecutive X-bit code blocks in the X-bit code block stream to a TUflex frame.

503. Map the TUflex frame to the payload area of the HO OPU frame, where a transmission period of the payload area of the HO OPU frame includes P payload blocks.

A plurality of payload blocks included in the TUflex frame may be uniformly distributed in the payload area of the HO OPU frame.

Figure 5B:
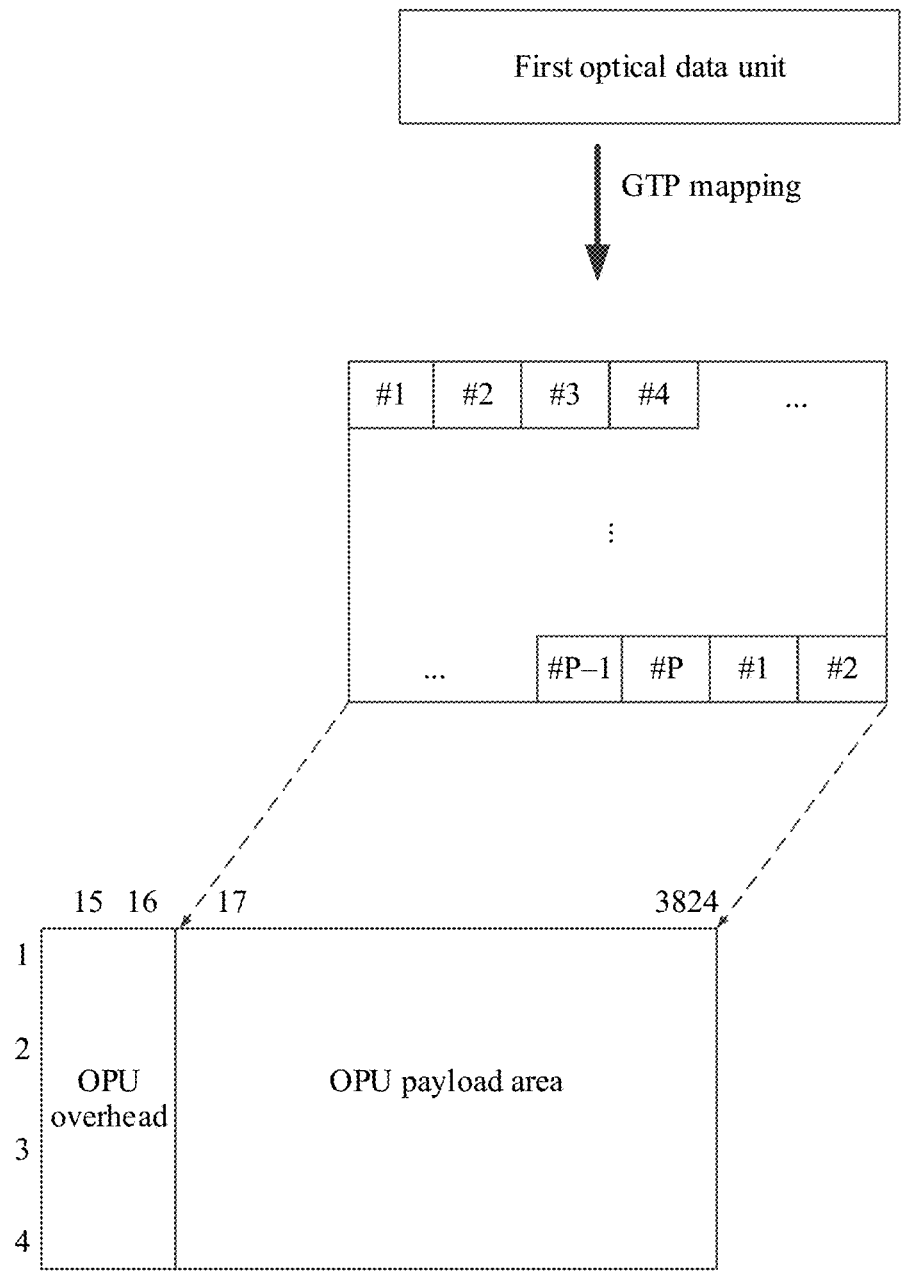
FIG. 5B is a schematic diagram of non-hybrid mapping according to an embodiment of this application.

The HO OPU frame may be, for example, an OPU1 frame, an OPU2 frame, an OPU3 frame, an OPU4 frame, or an OPUCn frame. FIG. 5B illustrates that the plurality of payload blocks included in the TUflex frame are uniformly distributed in a plurality of payload blocks in the payload area of the HO OPU frame.

504. Map the HO OPU frame to a HO ODU frame.

505. Map the HO ODU frame to an OTU frame.

506. Send the OTU frame.

It may be understood that the solution in this embodiment is mainly described by using an example in which an OPU frame is the HO OPU frame, a lower-rate ODU frame is the LO ODU frame (for example, the LO ODU frame is, in an example, an LO ODUj/flex frame), and a higher-rate ODU frame is the HO ODU frame. Certainly, an implementation in a case in which the OPU frame is another type of OPU frame, the lower-rate ODU frame is another type of ODU frame, and the higher-rate ODU frame is another type of ODU frame may be obtained by analogy.

It may be learned that in this embodiment, the uniform mapping procedure is used in the payload area of the HO OPU frame, and a payload block is used as a mapping granularity in the payload area of the HO OPU frame. Compared with a solution in which a tributary slot is used as a mapping granularity, the technical solution in this embodiment helps improve bandwidth utilization and flexibility in adjustment of a transmission rate of a client service. In addition, the uniform mapping procedure is used in the payload area of the HO OPU frame to perform mapping, which helps reduce mapping control complexity.

Figure 6A:
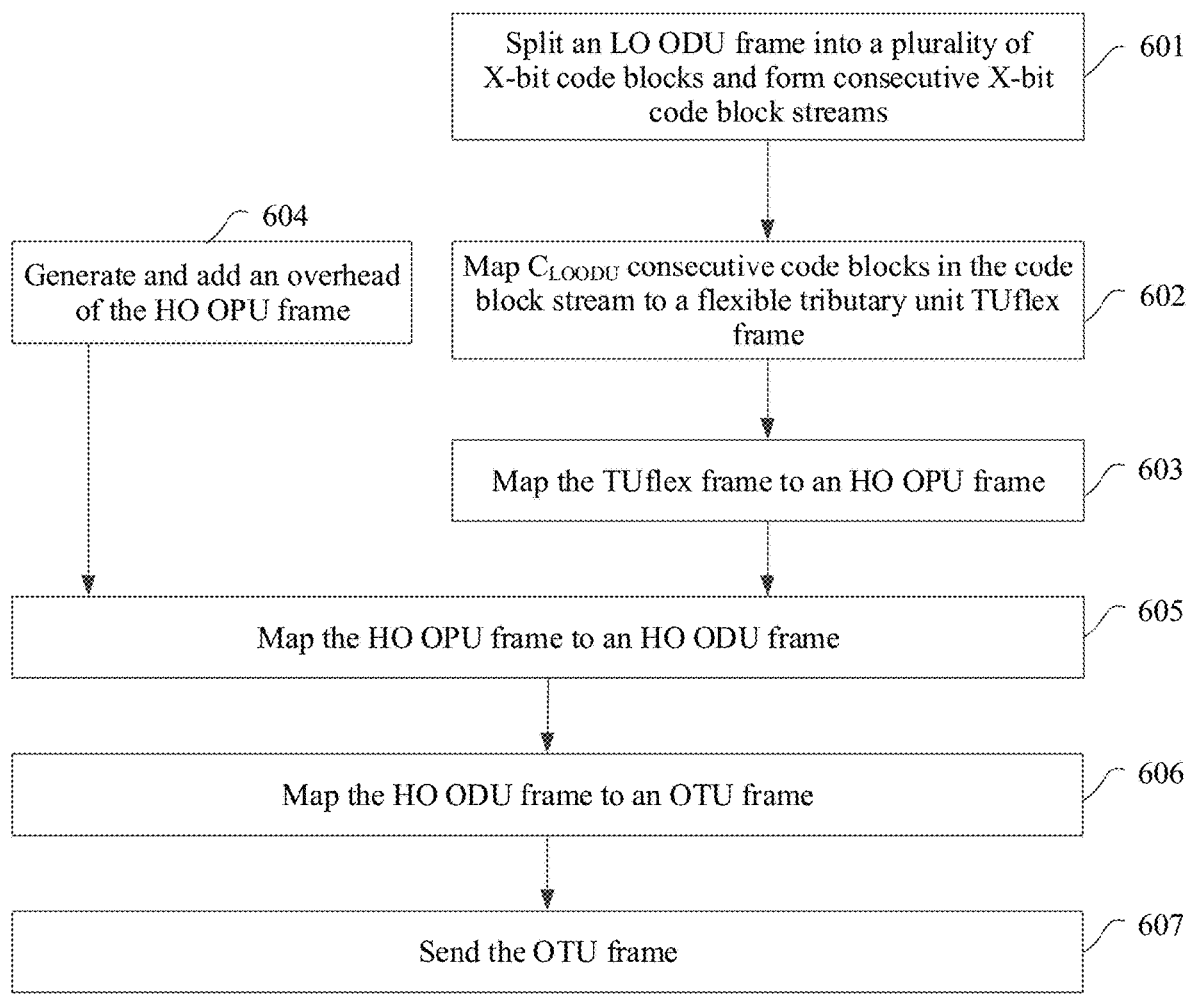
FIG. 6A is a schematic flowchart of another optical signal transmission method according to an embodiment of this application.

FIG. 6A is a schematic flowchart of another optical signal transmission method according to an embodiment of this application. In FIG. 6A, that a first optical data unit frame is an LO ODU frame and an OPU is a HO OPU is used as an example. Another optical signal transmission method may include the following steps.

601. Split the LO ODU frame into a plurality of X-Bit code blocks and form an X-bit code block stream.

602. Map $C_{LOODU}$ consecutive code blocks in the X-bit code block stream to a TUflex frame.

An X-Bit code block obtained by splitting the LO ODU frame corresponds to a payload block in the TUflex frame. A size of the payload block in the TUflex frame is Y-Bits, and each X-Bit code block has a size less than or equal to a size of the payload block corresponding to the X-bit code block, that is, X≤Y.

Before the LO ODU frame is mapped to the TUflex frame, a size of the TUflex frame may be determined, and a distribution location that is of the payload block included in the TUflex frame and that is in a payload area of the HO OPU frame may be further determined, that is, a quantity and a distribution manner of payload blocks occupied by the TUflex frame in the HO OPU frame that uses P payload blocks as a transmission period are determined.

It is assumed that the size of the payload block in the TUflex frame is Y-Bit, and $R_{PB}$ is a bit rate of a single payload block. A payload size of each payload block is X-Bit, and an overhead of each payload block is (Y−X) bits. $R_{PB-P}$ represents a payload rate of a single payload block, and $R_{PB-P}=R_{PB}*X/Y$.

A bit rate of the LO ODU frame is represented as $R_{LOODU}$, and a rate frequency offset of the LO ODU frame is represented as $OS_{LOODU}$, where $OS_{LOODU}$ may be, for example, 20 ppm, 30 ppm, or another value. A payload bit rate of the HO OPU frame is represented as $R_{HOOPU}$, and a rate frequency offset of the HO OPU frame is represented as $OS_{HOOPU}$, where $OS_{HOOPU}$ is, for example, 20 ppm, 25 ppm, 30 ppm, or another value.

$P=R_{HOOPU}/R_{PB}$. If a sufficient bearing capability needs to be reserved, $P=R_{HOOPU}(1-OS_{HOOPU})/R_{PB}(1+OS_{HOOPU})$, where P indicates a quantity of payload blocks included in a transmission period of the HO OPU frame, that is, the transmission period of the HO OPU frame is P. In a calculation process, a value of $R_{PB}$ or P may be first determined. In an example, first determining the value of $R_{PB}$ or first determining the value of P is not limited, and this may be flexibly selected based on a requirement. Generally, for HO OPU frames with a same bearing capacity, a larger value of P indicates a smaller value of $R_{PB}$, and a smaller value of P indicates a larger value of $R_{PB}$. In this case, $C_{nor}=\text{ceiling}[R_{LOODU}/R_{PB-P}]$, where:

$$C_{max}=\text{ceiling}[R_{LOODU}*(1+OS_{HOOPU})/(R_{PB-P}*(1-OS_{HOOPU}))], \text{ and}$$

$$C_{min}=\text{floor}[R_{LOODU}*(1-OS_{HOOPU})/(R_{PB-P}*(1+OS_{HOOPU}))].$$

The TUflex frame may have the following two optional construction manners. In one construction manner, a quantity of payload blocks in the TUflex frame is fixed. In the other construction manner, the quantity of payload blocks in the TUflex frame is variable. In other words, quantities of payload blocks that come from the LO ODU frame and that are mapped to different transmission periods of the OPU frame are fixed or variable.

TUflex frame construction manner 1: In each transmission period of the HO OPU frame, the quantity of payload blocks included in the TUflex frame is a fixed value $C_{TUflex}$, where $C_{TUflex}$ represents the quantity of payload blocks included in the TUflex frame. For example, the following may be defined. The quantity $C_{TUflex}$ of payload blocks included in the TUflex frame is greater than or equal to $C_{max}$. In an example, $C_{TUflex}=C_{max}$. In each transmission period of the HO OPU frame, the $C_{TUflex}$ payload blocks included in the TUflex frame are uniformly distributed in P payload blocks in a transmission period of the HO OPU frame. A specific uniform distribution manner may be determined by using, but is not limited to, a sigma-delta algorithm.

In this case, when the LO ODU frame is mapped to the TUflex frame, a quantity of payload blocks in the TUflex frame that need to be occupied by the LO ODU frame (that is, the X-Bit code blocks obtained by splitting the LO ODU frame) is $C_{LOODU}$, where a value range of $C_{LOODU}$ is [$C_{min}$, $C_{max}$]. To be specific, $C_{LOODU}$ X-Bit code blocks obtained by splitting the LO ODU frame are mapped to $C_{LOODU}$ Y-Bit payload blocks in the $C_{TUflex}$ Y-Bit payload blocks in the TUflex, where $C_{LOODU} \leq C_{TUflex}$. An idle payload block may be used for rate adaptation. When $C_{LOODU} < C_{TUflex}$, an idle payload block is filled in a proper location of the TUflex. In this case, the $C_{TUflex}$ payload blocks in the TUflex include ($C_{TUflex}$−$C_{LOODU}$) idle payload blocks and the $C_{LOODU}$ payload blocks that include the X-Bit code blocks in the LO ODU. When $C_{LOODU}$=$C_{TUflex}$, the TUflex include no idle payload block, that is, the $C_{TUflex}$ payload blocks in the TUflex all are payload blocks that include the X-Bit code blocks in the LO ODU. The idle payload block may be all filled with 0 or 1 or another preset value. In an overhead area, a tributary port number (TPN) corresponding to a service and an idle payload block indication overhead may be carried, or a special TPN value (for example, TPN=all 0 or all 1) is used to indicate that a current payload block is an idle payload block.

TUflex construction manner 2: In different transmission periods of the HO OPU frame, a value of the quantity $C_{TUflex}$ of payload blocks included in the TUflex frame is variable. In this case, for example, $C_{TUflex}$=$C_{LOODU}$, where a value range of the quantity $C_{TUflex}$ of payload blocks included in the TUflex frame is, for example, [$C_{min}$, $C_{max}$].

In this case, when the LO ODU frame is mapped to the TUflex frame, a quantity of payload blocks in the TUflex frame that need to be occupied by the LO ODU frame (that is, the X-Bit code blocks obtained by splitting the LO ODU frame) is $C_{LOODU}$, where a value range of $C_{LOODU}$ is [$C_{min}$, $C_{max}$]. $C_{LOODU}$ X-Bit code blocks obtained by splitting the LO ODU frame are mapped to the $C_{TUflex}$ Y-Bit payload blocks in the TUflex frame in a one-to-one manner. Because $C_{TUflex}$=$C_{LOODU}$, the $C_{TUflex}$ payload blocks included in the TUflex frame all are payload blocks that include the X-Bit code blocks in the LO ODU frame.

603. Map the TUflex frame to a HO OPU frame, that is, map the $C_{TUflex}$ payload blocks in the TUflex frame to locations of $C_{TUflex}$ payload blocks in P payload blocks in the HO OPU frame.

In a case of the TUflex frame construction manner 1, the $C_{TUflex}$ payload blocks in the TUflex frame may be mapped to the locations of the corresponding $C_{TUflex}$ payload blocks in the HO OPU frame in a one-to-one manner.

In a case of the TUflex frame construction manner 2, in each transmission period (P payload blocks) of the HO OPU frame, the $C_{TUflex}$ payload blocks in the TUflex frame are uniformly mapped to the locations of the $C_{TUflex}$ payload blocks in the P payload blocks in the HO OPU frame. A specific uniform distribution manner may be determined by using, but is not limited to, a sigma-delta algorithm.

604. Generate and add an overhead of the HO OPU frame.

The overhead of the HO OPU frame includes but is not limited to a payload type (PT) overhead, a tributary port number TPN overhead, a payload block occupation and distribution indication overhead, an overhead indicating a quantity of payload blocks occupied by the LO ODU frame, an overhead indicating a quantity of LO ODU frame services.

A new value may be defined for the PT overhead, for example, 0x24 or another value. The PT overhead may be carried in the fourth row and the fifteenth column in the first frame of the HO OPU frame. The PT overhead is used to indicate that a GTP mapping manner is currently used in the payload area of the HO OPU frame to bear the LO ODU frame.

A manner of processing another overhead may be as follows.

Manner 1: The overhead is borne in a payload block that bears the LO ODU frame, and a tributary port number TPN of the LO ODU frame is added to each payload block. In this case, Y>X, and an adding location is in an overhead area of (Y−X) bits in each payload block. In this case, a receive end can determine occupation and distribution of each payload block by using the TPN carried in the payload block, that is, a function of indicating occupation and distribution of the payload block can be achieved by using the TPN. The overhead indicating a quantity of payload blocks occupied by the LO ODU frame is optional. The overhead indicating a quantity of LO ODU frame services is optional.

Manner 2: The overhead is borne in a payload block independent of a payload block that bears the LO ODU frame. In this case, X≤Y, for example, Y=X (that is, a size of a payload block is equal to a size of an X-bit code block). When Y>X, optionally, the TPN is borne in the payload block. An overhead indicating a payload block that is in the HO OPU frame and that is occupied by the LO ODU frame is generated, that is, the payload block occupation and distribution indication overhead is generated. In the TUflex frame construction manner 1, the generated overhead is an overhead indicating distribution of the $C_{TUflex}$ payload blocks that are in the P payload blocks in each transmission period of the HO OPU frame and that are occupied by the TUflex frame, and the overhead indicating a quantity of payload blocks occupied by the LO ODU frame. In the TUflex frame construction manner 2, the generated overhead is an overhead indicating distribution of the $C_{LOODU}$ or $C_{TUflex}$ payload blocks that are in the P payload blocks in each transmission period of the HO OPU frame and that are occupied by the LO ODU frame or the TUflex frame. In this case, the overhead indicating a quantity of payload blocks occupied by the LO ODU frame may be implemented by a payload block occupation and distribution indication overhead interface. For example, these overheads may be carried by using a multiplex structure identifier (MSI, Multiplex Structure Identifier) overhead of the HO OPU frame or carried by using a special payload block.

Figure 6B:
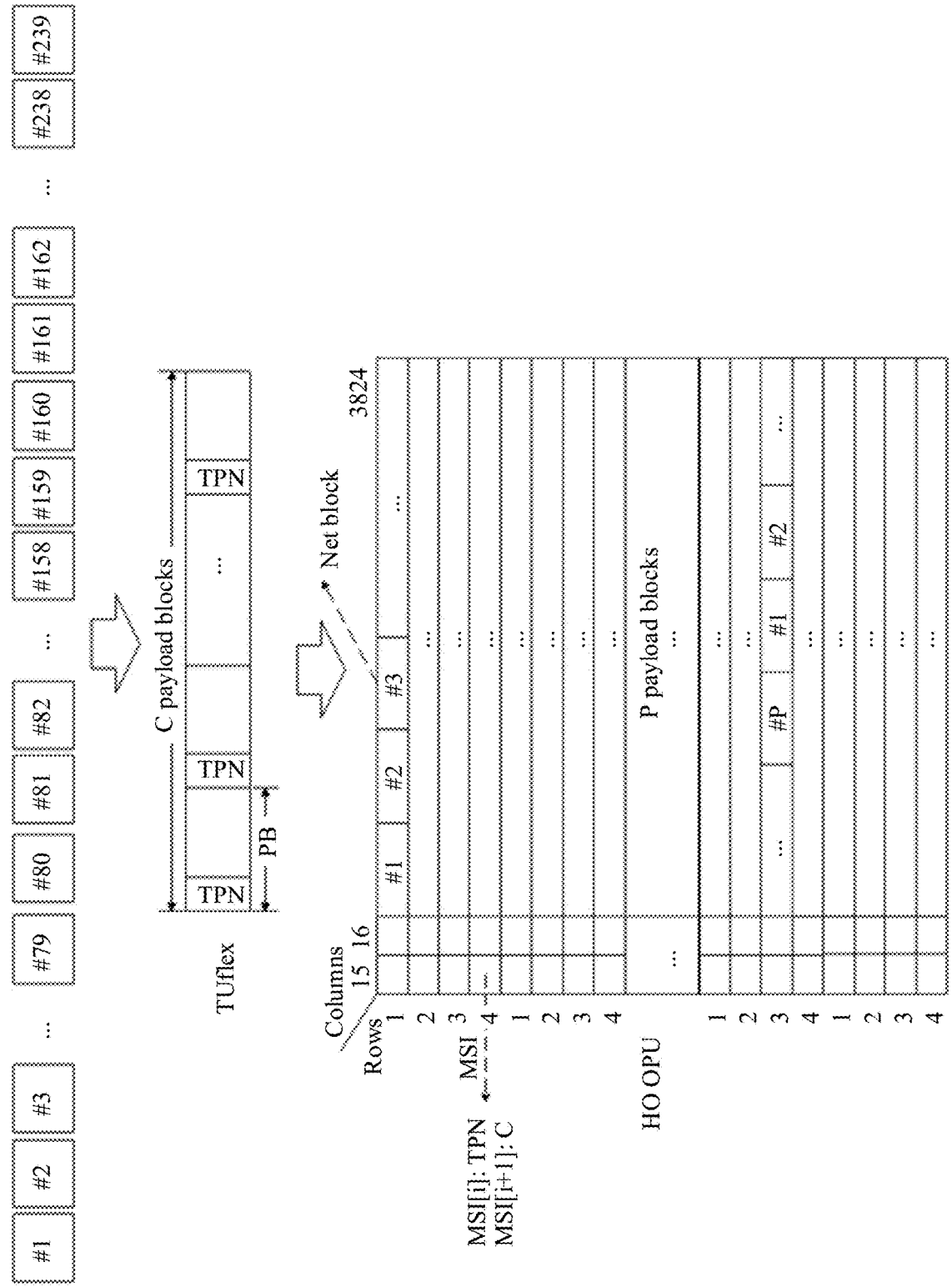
FIG. 6B is a schematic flowchart of performing carrying by using an MSI overhead according to an embodiment of this application.

FIG. 6B illustrates that the overhead may be carried by using the MSI overhead. For example, a specific manner of bearing the overhead in a payload block independent of a payload block that bears the LO ODU frame may be described in the following three manners.

In Manner 1 in which the overhead indicating a quantity and distribution of payload blocks in the HO OPU frame that are occupied by the LO ODU frame is carried by using an MSI, a newly defined payload type "PT=0x24" is used to indicate that a GTP mapping manner is used in the payload area of the HO OPU frame to bear the LO ODU frame.

Referring to FIG. 6C, an OMFI may be additionally defined. For example, a value of the OMFI circulates from 0 to 255. To be specific, the value of the OMFI is increased by 1 each time 256 HO OPU frames are counted, until the value increases from 0 to 255 and then becomes 0. Circulation is performed based on this. The MSI overhead of the HO OPU frame is indicated by jointly using an MFAS and the OMFI, and 256*256 MSI bytes may be indicated. For example, a meaning of each byte in the MSI is illustrated in FIG. 6C. "PT=0x24" indicates that a payload block mapping manner is currently used.

In Manner 2 in which the overhead indicating a quantity and distribution of payload blocks in the HO OPU frame that are occupied by the LO ODU frame is carried by using an MSI, MSI[2] to MSI[P+1] correspond to an occupation indication of the first to the $P^{th}$ payload blocks in the HO OPU frame. As illustrated in FIG. 6D, if a TPN #i is carried, it indicates that a current payload block is occupied by an LO ODU frame service whose tributary port number is #i.

In Manner 3 in which the overhead indicating a quantity and distribution of payload blocks in the HO OPU frame that are occupied by the LO ODU frame is carried by using an MSI, a special payload block is used in the payload area to bear an occupation indication of a payload block that is in the HO OPU frame and that is used to bear the LO ODU frame. A location of the special payload block may be indicated by using the MSI. MSI[2] to MSI[p+1] correspond to payload block locations in the HO OPU frame that correspond to the first to the $p^{th}$ special payload blocks. For example, MSI[2] carries "payload block #i", which indicates that the first special payload block is at a location of a payload block #i in the HO OPU frame.

605. Map the HO OPU frame to a HO ODU frame.
606. Map the HO ODU frame to an OTU frame.
607. Send the OTU frame.

It may be understood that the solution in this embodiment is mainly described by using an example in which an OPU frame is the HO OPU frame, a lower-rate ODU frame is the LO ODU frame (for example, the LO ODU frame is, in an example, an LO ODUj/flex frame), and a higher-rate ODU frame is the HO ODU frame. Certainly, an implementation in a case in which the OPU frame is another type of OPU frame, the lower-rate ODU frame is another type of ODU frame, and the higher-rate ODU frame is another type of ODU frame may be obtained by analogy.

It may be learned that in this embodiment, the LO ODU frame may be mapped to the payload area of the HO OPU frame at a payload block granularity, that is, the payload block may be used as a mapping granularity in the payload area of the HO OPU frame. Because a granularity size of the payload block is far smaller than a granularity size of the tributary slot, compared with a solution in which the tributary slot is used as a mapping granularity, the technical solution in this embodiment helps improve bandwidth utilization and flexibility in adjustment of a transmission rate of a client service signal.

Figure 7:
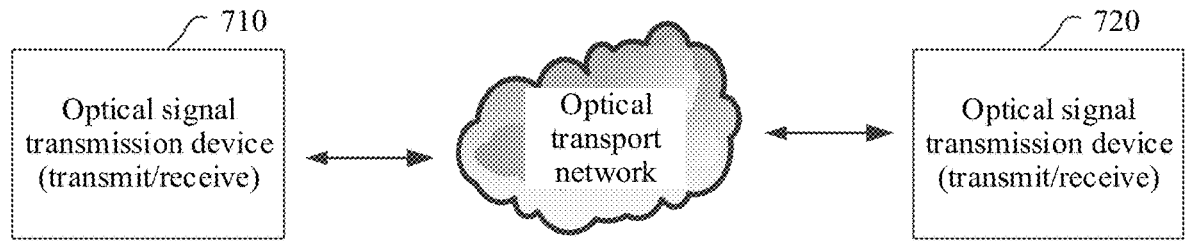
FIG. 7 is a schematic diagram of an architecture of an optical network system according to an embodiment of this application.

FIG. 7 is a schematic diagram of an optical signal transmission system. The optical signal transmission system may include a plurality of optical signal transmission devices 710 and 720 interconnected by using an optical switching network. The optical signal transmission device 710 and the optical signal transmission device 720 may be used in the optical signal transmission method provided in the embodiments of this application. The optical signal transmission device 710 and the optical signal transmission device 720 may have both a function of sending an OTU frame and a function of receiving an OTU frame. When the optical signal transmission device 710 is configured to send an OTU frame, the optical signal transmission device 720 may be configured to receive the OTU frame; or when the optical signal transmission device 720 is configured to send an OTU frame, the optical signal transmission device 710 may be configured to receive the OTU frame. Certainly, some optical signal transmission devices may have only the function of sending an OTU frame or the function of receiving an OTU frame. An optical signal transmission device that is in the optical signal transmission system and that has the function of sending an OTU frame may be configured to perform some or all of the steps of any optical signal transmission method provided in the embodiments of this application.

Figure 8:
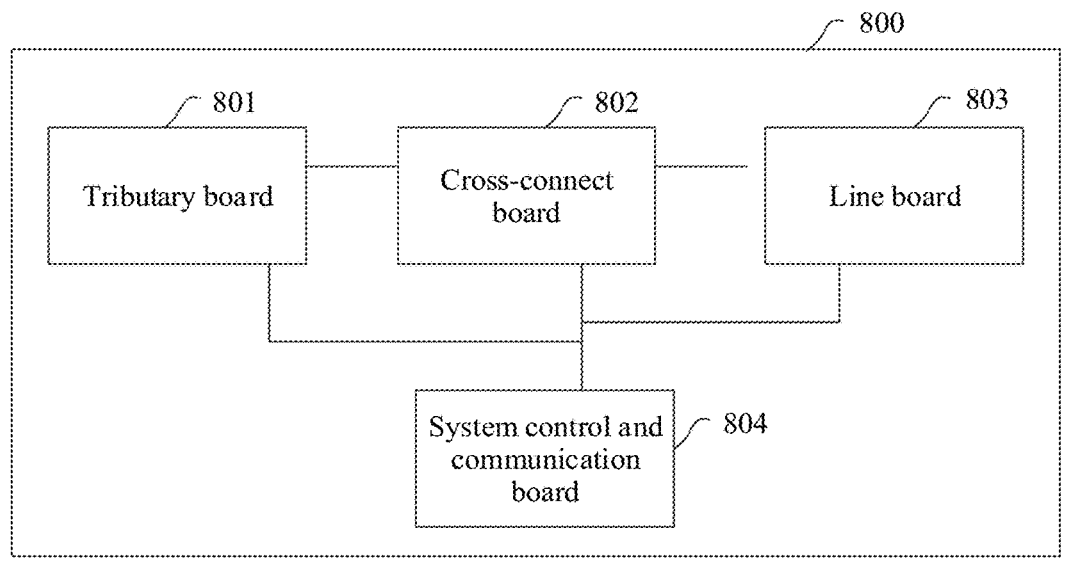
FIG. 8 is a schematic diagram of a possible hardware structure of an optical signal transmission device according to an embodiment of this application.

FIG. 8 is a schematic diagram of a possible hardware structure of an optical signal transmission device. In an example, an optical signal transmission device 800 includes a tributary board 801, a cross-connect board 802, a line board 808, an optical-layer processing board (not shown in the figure), and a system control and communication board 804. Based on a specific requirement, an optical signal transmission device may include different board types and different quantities of boards. For example, an optical signal transmission device serving as a core node does not have the tributary board 801. For another example, an optical signal transmission device serving as an edge node has a plurality of tributary boards 801 or does not have the cross-connect board 802. For still another example, an optical signal transmission device that supports only an electrical-layer function may not have the optical-layer processing board.

The tributary board 801, the cross-connect board 802, and the line board 808 are configured to process an electrical-layer signal in a transmission network. The tributary board 801 may be configured to receive and send various client services, for example, an SDH service, a packet service, an Ethernet service, and a forward service. Further, the tributary board 801 may be divided into, for example, a client-side optical module and a signal processor. The client-side optical module may be an optical transceiver, configured to receive and/or send service data. The signal processor is configured to map the service data to a data frame and demap the service data from the data frame. The cross-connect board 802 is configured to switch a data frame, to switch one or more types of data frames. The line board 808 mainly processes a line-side data frame. In an example, the line board 808 may be divided into a line-side optical module and a signal processor. The line-side optical module may be a line-side optical transceiver, configured to receive and/or send a data frame. The signal processor is configured to multiplex and demultiplex a line-side data frame or map and demap the line-side data frame. The system control and communication board 804 is configured to implement system control. In an example, the system control and communication board 804 may collect information from different boards by using a backplane or send a control instruction to a corresponding board. It should be noted that, unless otherwise specified, there may be one or more specific components (for example, one or more signal processors). This is not limited in this application. It should be further noted that a type of a board included in a device, function design of the board, and a quantity of boards are not limited in this application. It should be noted that in specific implementation, the foregoing two boards may alternatively be designed into one board. In addition, the optical signal transmission device 800 may further include, for example, a backup power supply, a fan for heat dissipation, and the like.

For example, the tributary board 801 may be configured to perform some or all of the steps of any optical signal transmission method provided in the embodiments of this application. For function implementation details of the tributary board 801, refer to, for example, the related detailed descriptions of the optical signal transmission method provided in the method embodiment. Details are not described herein again.

Figure 9:
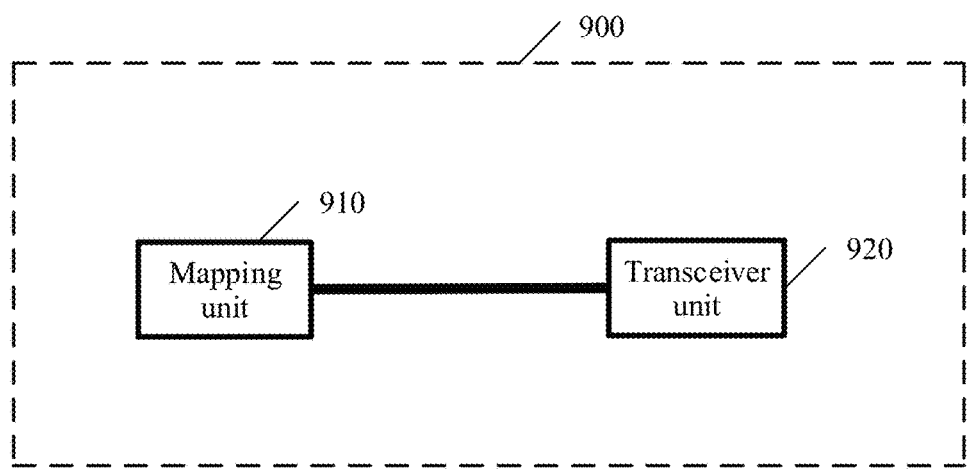
FIG. 9 is a schematic diagram of another possible structure of an optical signal transmission device according to an embodiment of this application.

FIG. 9 shows another optical signal transmission device 900 according to an embodiment of this application, which may include a mapping unit 910 and a transceiver unit 920. The mapping unit 910 is configured to map a first optical data unit frame to a first frame, where the first TUflex frame includes a plurality of payload blocks; map the first TUflex frame to a first OPU frame, where the plurality of payload blocks included in the first TUflex frame are distributed in a payload area of the first OPU frame; map the first OPU frame to a second optical data unit frame, where a bit rate of the second optical data unit frame is greater than a bit rate of the first optical data unit frame; and map the second optical data unit frame to a first optical transport unit frame.

The transceiver unit 920 is configured to send the first optical transport unit frame.

In some possible implementations, quantities of payload blocks that come from the first TUflex frame and that are mapped to different transmission periods of the first OPU frame may be fixed or variable.

For example, a quantity of payload blocks included in the first TUflex frame is $C_{TUflex}=C_{LOODU}$ (the quantities of payload blocks that come from the first TUflex frame and that are mapped to different transmission periods of the first OPU frame are variable). For another example, the quantity of payload blocks included in the first TUflex frame is $C_{TUflex} \geq C_{max}$ (the quantities of payload blocks that come from the first TUflex frame and that are mapped to different transmission periods of the first OPU frame are fixed).

In some possible implementations, when a rate needs to be adjusted, the mapping unit 910 is further configured to map a third optical data unit frame to a second TUflex frame, where the second TUflex frame includes C2 payload blocks; map the second TUflex frame to a second OPU frame, where the C2 payload blocks included in the second TUflex frame are distributed in a payload area of the second OPU frame, C2=C1*R1/R2, R1 is a bit rate of the first OPU frame, R2 is a bit rate of the second OPU frame, C1 is a quantity of payload blocks included in the first TUflex frame, and the third optical data unit frame and the first optical data unit frame are used to bear service data of a same client; map the second OPU frame to a fourth optical data unit frame, where a bit rate of the fourth optical data unit frame is greater than a bit rate of the third optical data unit frame; and map the fourth optical data unit frame to a second optical transport unit frame.

The transceiver unit 920 is further configured to send the second optical transport unit frame.

In some other possible implementations, when a rate needs to be adjusted, the mapping unit 910 is further configured to map a third optical data unit frame to a second TUflex frame; map the second TUflex frame to a second OPU frame, where a plurality of payload blocks included in the second TUflex frame are distributed in a payload area of the second OPU frame, P2=P1*R2/R1, R1 is a bit rate of the first OPU frame, R2 is a bit rate of the second OPU frame, P1 is a quantity of payload blocks included in a transmission period of the first OPU frame, P2 is a quantity of payload blocks included in a transmission period of the second OPU frame, a quantity of payload blocks included in the second TUflex frame is the same as a quantity of payload blocks included in the first TUflex frame, and the third optical data unit frame and the first optical data unit frame are used to bear service data of a same client; map the second OPU frame to a fourth optical data unit frame, where a bit rate of the fourth optical data unit frame is greater than a bit rate of the third optical data unit frame; and map the fourth optical data unit frame to a second optical transport unit frame.

The transceiver unit 920 is further configured to send the second optical transport unit frame.

For function implementation details of each functional unit in the optical signal transmission device 900, refer to, for example, the related detailed descriptions of the optical signal transmission method provided in the method embodiment, for example, refer to the related descriptions in the embodiment corresponding to FIG. 2A, FIG. 3A, FIG. 4A, FIG. 5A, or FIG. 6A. Details are not described herein again.

Figure 10:
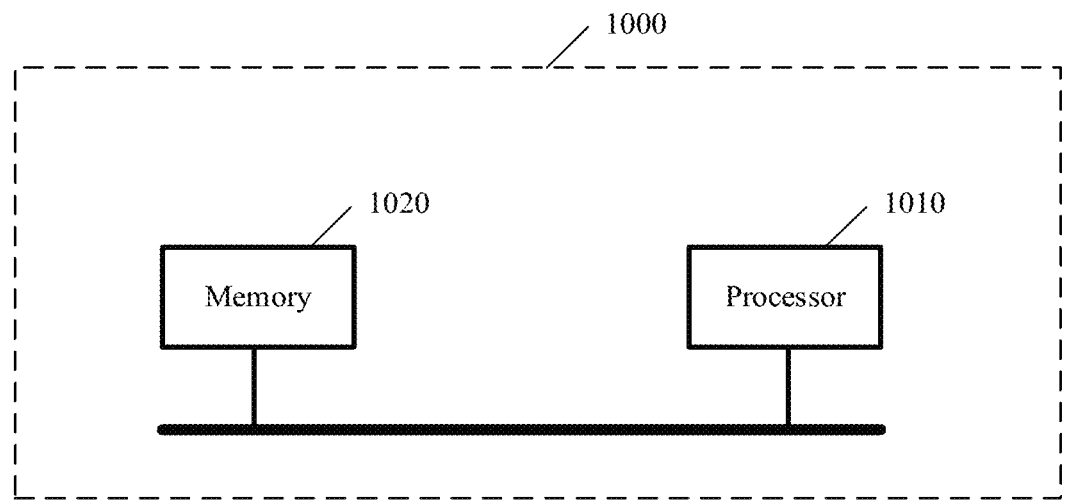
FIG. 10 is a schematic diagram of another possible structure of an optical signal transmission device according to an embodiment of this application.

FIG. 10 shows an optical signal transmission device 1000 according to an embodiment of this application, including a processor 1010 and a memory 1020 coupled to each other. The processor 1010 is configured to invoke a computer program stored in the memory 1020 to perform some or all of the steps of any optical signal transmission method provided in the embodiments of this application.

Figure 11:
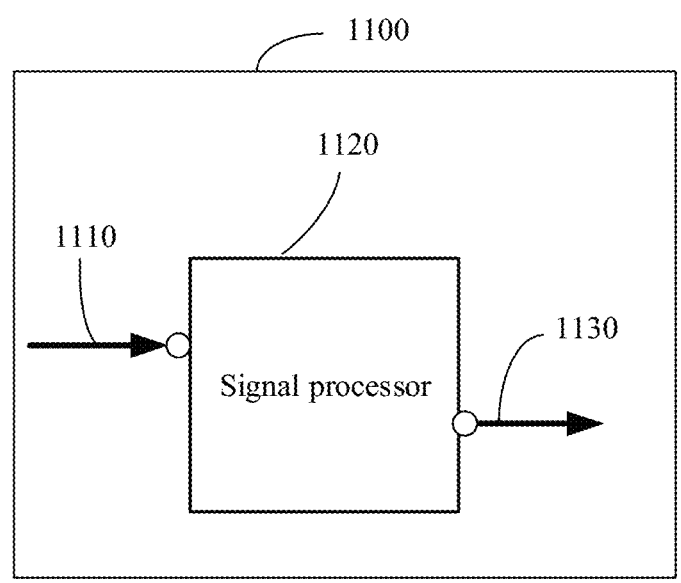
FIG. 11 is a schematic diagram of another possible structure of an optical signal transmission device according to an embodiment of this application.

FIG. 11 shows a communication apparatus 1100 according to an embodiment of this application, including at least one input end 1110, a signal processor 1120, and at least one output end 1130. The signal processor 1120 is configured to perform some or all of the steps of any optical signal transmission method provided in the embodiments of this application.

Figure 12:
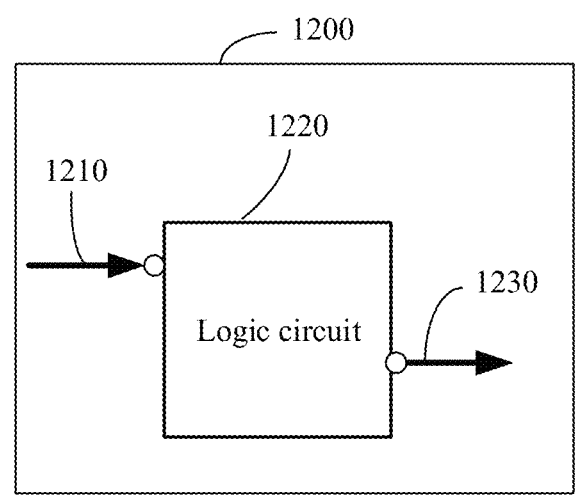
FIG. 12 is a schematic diagram of another possible structure of an optical signal transmission device according to an embodiment of this application.

FIG. 12 shows a communication apparatus 1200 according to an embodiment of this application, including an input interface circuit 1210, a logic circuit 1220, and an output interface circuit 1230. The logic circuit 1220 is configured to perform some or all of the steps of any optical signal transmission method provided in the embodiments of this application.

An embodiment of this application provides a chip system. The chip system includes a processor, configured to support an optical signal transmission device in implementing some or all of the steps of any optical signal transmission method provided in the embodiments of this application.

An embodiment of this application further provides a computer-readable storage medium. The computer-readable storage medium stores a computer program, and the computer program is executed by hardware (for example, a processor), to perform some or all of the steps of any method performed by any device in the embodiments of this application.

All or some of the foregoing embodiments may be implemented by means of software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to any one of the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the descriptions of each embodiment have respective focuses. For a part that is not described in detail in an embodiment, refer to related descriptions in other embodiments.

In the foregoing embodiments, the descriptions of each embodiment have respective focuses. For a part that is not described in detail in an embodiment, refer to related descriptions in other embodiments. In the embodiments provided in this application, it should be understood that the disclosed apparatus may be implemented in other manners.

For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electrical or other forms.

The units described as separate parts may or may not be physically separate, and parts displayed as units may or may not be physical units, in other words, may be located in one position, or may be distributed on a plurality of network units. Some or all of the units may be selected according to actual needs to achieve the objectives of the solutions of embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the disclosed technical solutions may be implemented in a form of a computer software product. The computer software product is stored in a storage medium and includes several instructions for instructing a computer device (which may be a personal computer, a server, a network device, or the like) to perform all or some of the steps of the method described in the embodiments of this application. The foregoing storage medium may include, for example, any medium that can store program code, such as a Universal serial Bus (USB) flash drive, a removable hard disk, a read-only memory (ROM), a random-access memory (RAM), a magnetic disk, or an optical disc.

What is claimed is:

1. An optical signal transmission method, comprising:
    mapping a first optical data unit (ODU) frame to a first flexible tributary unit (TUflex) frame, wherein the first flexible tributary unit frame comprises a plurality of payload blocks;
    mapping the first TUflex frame to a first optical payload unit (OPU) frame, wherein the payload blocks are distributed into a payload area of the first OPU frame;
    mapping the first OPU frame to a second optical data unit frame, wherein a bit rate of the second optical data unit frame is greater than a bit rate of the first optical data unit frame;
    mapping the second ODU frame to a first optical transport unit (OTU) frame; and
    sending the first OTU frame.

2. The optical signal transmission method of claim 1, further comprising receiving a quantity of the payload blocks that are mapped to different transmission periods of the first OPU frame as fixed payload blocks or variable payload blocks.

3. The optical signal transmission method of claim 1, wherein mapping the first ODU frame to the first TUflex frame comprises:
    splitting the first ODU frame into X-bit code blocks to form an X-bit code block stream; and
    mapping a plurality of consecutive X-bit code blocks in the X-bit code block stream to the first TUflex frame, wherein the consecutive X-bit code blocks are in a one-to-one correspondence with the payload blocks, and wherein X is an integer multiple of 64.

4. The optical signal transmission method of claim 3, wherein the first ODU frame comprises N ODU frames, and wherein the splitting comprises splitting the first ODU frame into M X-bit code blocks to form the X-bit code block stream, and wherein N and M are positive integers.

5. The optical signal transmission method of claim 4, wherein an overhead area of the first OPU frame carries a multiframe identifier when N is greater than 1, and wherein the multiframe identifier indicates a location of a current ODU frame in the N ODU frames.

6. The optical signal transmission method of claim 1, wherein each of the payload blocks carries a client service identifier of the first ODU frame.

7. The optical signal transmission method of claim 1, wherein the first OPU frame carries an overhead identifier that indicates locations of the payload blocks that are in the payload area.

8. The optical signal transmission method of claim 7, wherein the overhead identifier is carried in an overhead area of the first OPU frame, or the overhead identifier is carried in at least one payload block in the first OPU frame.

9. The optical signal transmission method of claim 1, wherein the payload area comprises a first payload partition and a second payload partition, wherein the payload blocks are distributed in the first payload partition, wherein a slot comprised in the first payload partition is different from another slot comprised in the second payload partition, and wherein a mapping procedure of the first payload partition is different from another mapping procedure of the second payload partition.

10. The optical signal transmission method of claim 1, wherein the payload area comprises a third payload partition and a fourth payload partition, wherein the payload blocks are distributed in the third payload partition, wherein an optical payload unit frame at 100 gigabits per second (OPUC) comprised in the third payload partition is different from another OPUC comprised in the fourth payload partition, and wherein a mapping procedure of the third payload partition is different from another mapping procedure of the fourth payload partition.

11. The optical signal transmission method of claim 1, further comprising:
    mapping a third ODU frame to a second TUflex frame, wherein the second TUflex frame comprises C2 payload blocks;
    mapping the second TUflex frame to a second OPU frame, wherein the C2 payload blocks are distributed in a payload area of the second OPU frame, wherein $R2=C1*R1/C2$, wherein the R1 is a bit rate of the first OPU frame, wherein the R2 is a bit rate of the second OPU frame, wherein the C1 is a quantity of the payload blocks, and wherein the third ODU frame and the first ODU frame are used to bear service data of a same client;
    mapping the second OPU frame to a fourth ODU frame, wherein a bit rate of the fourth ODU frame is greater than a bit rate of the third ODU frame;
    mapping the fourth ODU frame to a second OTU frame; and
    sending the second OTU frame.

12. The optical signal transmission method of claim 1, further comprising:

mapping a third ODU frame to a second TUflex frame;
mapping the second TUflex frame to a second OPU frame, wherein a plurality of payload blocks comprised in the second TUflex frame are distributed in a payload area of the second OPU frame, wherein P2=P1*R2/R1, wherein the R1 is a bit rate of the first OPU frame, wherein the R2 is a bit rate of the second OPU frame, wherein the P1 is a first quantity of payload blocks comprised in a transmission period of the first OPU frame, wherein the P2 is a second quantity of payload blocks comprised in a transmission period of the second OPU frame, wherein a third quantity of the payload blocks in the second TUflex frame is the same as a fourth quantity of the payload blocks, and wherein the third ODU frame and the first ODU frame are used to bear service data of a same client;
mapping the second OPU frame to a fourth ODU frame, wherein a bit rate of the fourth ODU frame is greater than a bit rate of the third ODU frame;
mapping the fourth ODU frame to a second OTU frame; and
sending the second OTU frame.

13. An optical signal transmission device, comprising:
a processor; and
a memory coupled to the processor and configured to store a computer program comprising instructions that when invoked by the processor cause the optical signal transmission device to:
   map a first optical data unit (ODU) frame to a first flexible tributary unit (TUflex) frame, wherein the first TUflex frame comprises a plurality of payload blocks;
   map the first TUflex frame to a first optical payload unit (OPU) frame, wherein the payload blocks are distributed into a payload area of the first OPU frame;
   map the first OPU frame to a second ODU frame, wherein a bit rate of the second ODU frame is greater than a bit rate of the first ODU frame;
   map the second ODU frame to a first optical transport unit (OTU) frame; and
   send the first OTU frame.

14. The optical signal transmission device of claim 13, wherein when invoked by the processor, the instructions cause the optical signal transmission device to receive a quantity of the payload blocks that are mapped to different transmission periods of the first OPU frame as fixed payload blocks or variable payload blocks.

15. The optical signal transmission device of claim 14, wherein when invoked by the processor, the instructions to map the first ODU frame to the first TUflex frame cause the optical signal transmission to:
   split the first ODU frame into X-bit code blocks to form an X-bit code block stream; and
   map a plurality of consecutive X-bit code blocks in the X-bit code block stream to the first TUflex frame, wherein the consecutive X-bit code blocks are in a one-to-one correspondence with the payload blocks, and wherein X is an integer multiple of 64.

16. The optical signal transmission device of claim 15, wherein the first ODU frame comprises N ODU frames, and wherein when invoked by the processor, the instructions to split the first ODU frame into the X-bit code blocks comprises split the first ODU frame into M X-bit code blocks to form the X-bit code block stream, and wherein N and M are positive integers.

17. A computer program product comprising computer-executable instructions that are stored on a non-transitory computer-readable medium and that, when executed by a processor, cause a chip to:
   map a first optical data unit (ODU) frame to a first flexible tributary unit (TUflex) frame, wherein the first TUflex frame comprises a plurality of payload blocks;
   map the first TUflex frame to a first optical payload unit (OPU) frame, wherein the payload blocks are distributed into a payload area of the first OPU frame;
   map the first OPU frame to a second ODU frame, wherein a bit rate of the second ODU frame is greater than a bit rate of the first ODU frame;
   map the second ODU frame to a first optical transport unit (OTU) frame; and
   send the first OTU frame.

18. The computer program product of claim 17, wherein the payload area comprises:
   a first payload partition comprising a slot, wherein the payload blocks are distributed in the first payload partition; and
   a second payload partition comprising another slot, wherein the slot is different from the other slot, and wherein a mapping procedure of the first payload partition is different from another mapping procedure of the second payload partition.

19. The computer program product of claim 17, wherein the payload area comprises:
   a third payload partition comprising an optical payload unit frame at 100 gigabits per second (OPUC), wherein the payload blocks are distributed in the third payload partition; and
   a fourth payload partition comprising another OPUC, wherein the OPUC is different from the other OPUC, and wherein a mapping procedure of the third payload partition is different from another mapping procedure of the fourth payload partition.

20. The computer program product of claim 17, wherein the computer-executable instructions further cause the chip to:
   map a third ODU frame to a second TUflex frame, wherein the second TUflex frame comprises C2 payload blocks;
   map the second TUflex frame to a second OPU frame, wherein the C2 payload blocks are distributed in a payload area of the second OPU frame, wherein R2=C1*R1/C2, wherein the R1 is a bit rate of the first OPU frame, wherein the R2 is a bit rate of the second OPU frame, wherein the C1 is a quantity of the payload blocks, and wherein the third ODU frame and the first ODU frame are configured to bear service data of a same client;
   map the second OPU frame to a fourth ODU frame, wherein a bit rate of the fourth ODU frame is greater than a bit rate of the third ODU frame;
   map the fourth ODU frame to a second OTU frame; and
   send the second OTU frame.

* * * * *